US011030782B2

(12) United States Patent
Ayush et al.

(10) Patent No.: US 11,030,782 B2
(45) Date of Patent: Jun. 8, 2021

(54) ACCURATELY GENERATING VIRTUAL TRY-ON IMAGES UTILIZING A UNIFIED NEURAL NETWORK FRAMEWORK

(71) Applicant: Adobe Inc., San Jose, CA (US)

(72) Inventors: Kumar Ayush, Jamshedpur (IN); Surgan Jandial, Jammu (IN); Abhijeet Kumar, Bengaluru (IN); Mayur Hemani, New Delhi (IN); Balaji Krishnamurthy, Noida (IN); Ayush Chopra, Delhi (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/679,165

(22) Filed: Nov. 9, 2019

(65) Prior Publication Data

US 2021/0142539 A1 May 13, 2021

(51) Int. Cl.
*G06T 11/40* (2006.01)
*G06T 3/00* (2006.01)
*G06N 3/08* (2006.01)
*G06N 3/04* (2006.01)

(52) U.S. Cl.
CPC ............ *G06T 11/40* (2013.01); *G06N 3/0454* (2013.01); *G06N 3/08* (2013.01); *G06T 3/0093* (2013.01); *G06T 2210/16* (2013.01); *G06T 2210/44* (2013.01)

(58) Field of Classification Search
CPC ... G06T 11/40; G06T 3/0093; G06T 2210/16; G06T 2210/44; G06N 3/0454; G06N 3/08
See application file for complete search history.

(56) References Cited

U.S. PATENT DOCUMENTS

2017/0018024 A1\* 1/2017 Xu ..................... G06Q 30/0643
2019/0014884 A1\* 1/2019 Fu ...................... G06K 9/00281

OTHER PUBLICATIONS

Gong, X. Liang, X. Shen, and L. Lin, "Look into person: Self-supervised structure-sensitive learning and a new benchmark for human parsing", CVPR, 2017 (Year: 2017).\*
S. Belongie, J. Malik, and J. Puzicha. Shape context: A new descriptor for shape matching and object recognition. In Advances in neural information processing systems, pp. 831-837, 2001.

(Continued)

*Primary Examiner* — William A Beutel
(74) *Attorney, Agent, or Firm* — Keller Jolley Preece

(57) ABSTRACT

The present disclosure relates to systems, methods, and non-transitory computer readable media for generating a virtual try-on digital image utilizing a unified neural network framework. For example, the disclosed systems can utilize a coarse-to-fine warping process to generate a warped version of a product digital image to fit a model digital image. In addition, the disclosed systems can utilize a texture transfer process to generate a corrected segmentation mask indicating portions of a model digital image to replace with a warped product digital image. The disclosed systems can further generate a virtual try-on digital image based on a warped product digital image, a model digital image, and a corrected segmentation mask. In some embodiments, the disclosed systems can train one or more neural networks to generate accurate outputs for various stages of generating a virtual try-on digital image.

20 Claims, 14 Drawing Sheets

(56) References Cited

OTHER PUBLICATIONS

A. Chopra, A. Sinha, H. Gupta, M. Sarkar, K. Ayush, and B. Krishnamurthy. Powering robust fashion retrieval with information rich feature embeddings. In Proceedings of the IEEE Conference on Computer Vision and Pattern Recognition Workshops, pp. 0-0, 2019.
G. Cucurull, P. Taslakian, and D. Vazquez. Context-aware visual compatibility prediction. In The IEEE Conference on Computer Vision and Pattern Recognition (CVPR), Jun. 2019.
P. Esser, E. Sutter, and B. Ommer. A variational u-net for conditional appearance and shape generation. 2018.
X. Han, Z. Wu, Z. Wu, R. Yu, and L. S. Davis. VITON: an image-based virtual try-on network. CoRR, abs/1711.08447, 2017.
M. Heusel, H. Ramsauer, T. Unterthiner, B. Nessler, and S. Hochreiter. Gans trained by a two time-scale update rule converge to a local nash equilibrium. In I. Guyon, U. V. Luxburg, S. Bengio, H. Wallach, R. Fergus, S. Vishwanathan, and R. Garnett, editors, Advances in Neural Information Processing Systems 30, pp. 6626-6637. Curran Associates, Inc., 2017.
M. Jaderberg, K. Simonyan, A. Zisserman, and k. kavukcuoglu. Spatial transformer networks. In C. Cortes, N. D. Lawrence, D. D. Lee, M. Sugiyama, and R. Garnett, editors, Advances in Neural Information Processing Systems 28, pp. 2017-2025. Curran Associates, Inc., 2015.
N. Jetchev and U. Bergmann. The conditional analogy gan: Swapping fashion articles on people images. In The IEEE International Conference on Computer Vision (ICCV) Work-shops, Oct. 2017.
D. P. Kingma and J. Ba. Adam: A method for stochastic optimization. arXiv preprint arXiv:1412.6980, 2014.
Z. Liu, P. Luo, S. Qiu, X. Wang, and X. Tang. Deepfashion: Powering robust clothes recognition and retrieval with rich annotations. In The IEEE Conference on Computer Vision and Pattern Recognition (CVPR), Jun. 2016.
L. Ma, X. Jia, Q. Sun, B. Schiele, T. Tuytelaars, and L. Van Gool. Pose guided person image generation. In I. Guyon, U. V. Luxburg, S. Bengio, H. Wallach, R. Fergus, S. Vishwanathan, and R. Garnett, editors, Advances in Neural Information Processing Systems 30, pp. 406-416. Curran Associates, Inc., 2017.
G. Pons-Moll, S. Pujades, S. Hu, and M. Black. Clothcap: Seamless 4d clothing capture and retargeting. ACM Transactions on Graphics, (Proc. SIGGRAPH), 36(4), 2017. Two first authors contributed equally.
A. Pumarola, A. Agudo, A. Sanfeliu, and F. Moreno-Noguer. Unsupervised person image synthesis in arbitrary poses. 2018 IEEE/CVF Conference on Computer Vision and Pattern Recognition, pp. 8620-8628, 2018.
A.Raj, P. Sangkloy, H. Chang, J. Hays, D. Ceylan, and J. Lu. Swapnet: Image based garment transfer. In ECCV, 2018.
O. Ronneberger, P. Fischer, and T. Brox. U-net: Convolutional networks for biomedical image segmentation. In International Conference on Medical image computing and computer-assisted intervention, pp. 234-241. Springer, 2015.
T. Salimans, I. Goodfellow, W. Zaremba, V. Cheung, A. Radford, X. Chen, and X. Chen. Improved techniques for training gans. In D. D. Lee, M. Sugiyama, U. V. Luxburg, I. Guyon, and R. Garnett, editors, Advances in Neural Information Processing Systems 29, pp. 2234-2242. Curran Associates, Inc., 2016.
M. Sekine, K. Sugita, F. Perbet, B. Stenger, and M. Nishiyama. Virtual fitting by single-shot body shape estimation. In Int. Conf. on 3D Body Scanning Technologies, pp. 406-413. Citeseer, 2014.
A. Siarohin, E. Sangineto, S. Lathuiliere, and N. Sebe. Deformable gans for pose-based human image generation. CoRR, abs/1801.00055, 2018.
M. I. Vasileva, B. A. Plummer, K. Dusad, S. Rajpal, R. Kumar, and D. Forsyth. Learning type-aware embeddings for fashion compatibility. In ECCV, 2018.
B. Wang, H. Zhang, X. Liang, Y. Chen, L. Lin, and M. Yang. Toward characteristic-preserving image-based virtual try-on network. CoRR, abs/1807.07688, 2018.
Z. Wang, A. C. Bovik, H. R. Sheikh, and E. P. Simoncelli. Image quality assessment: From error visibility to structural similarity. IEEE Transactions on Image Process-ing, 13(4):600-612, 2004.
Z. Wang, E. P. Simoncelli, and A. C. Bovik. Multi-scale structural similarity for image quality assessment. In in Proc. IEEE Asilomar Conf. on Signals, Systems, and Computers, (Asilomar, pp. 1398-1402, 2003.

* cited by examiner

| Configuration | SSIM | MS-SSIM | FID | PSNR | IS |
|---|---|---|---|---|---|
| GMM + TOM (CP-VTON) | 0.698 | 0.746 | 20.331 | 14.544 | 2.66 ± 0.14 |
| GMM + SATT | 0.751 | 0.787 | 15.89 | 16.05 | 2.84 ± 0.13 |
| C2F + SATT | 0.755 | 0.794 | 14.79 | 16.39 | 2.80 ± 0.08 |
| C2F + SATT-D (SieveNet) | 0.766 | 0.809 | 14.65 | 16.98 | 2.82 ± 0.09 |

ACCURATELY GENERATING VIRTUAL TRY-ON IMAGES UTILIZING A UNIFIED NEURAL NETWORK FRAMEWORK

BACKGROUND

Providing interactive shopping experiences has become an important problem for developers in recent years. Consequently, several digital image systems have developed to deliver smart, intuitive online experiences including clothing retrieval, compatibility prediction, and virtual try-on to visualize products in a personalized setting. For example, some conventional digital image systems can enable a user to virtually try-on a specific garment.

Despite these advances however, conventional digital image systems continue to suffer from a number of disadvantages in accuracy, efficiency, and flexibility. For example, conventional digital image systems often inaccurately generate digital images that depict blurry or bleeding garment textures that result in unrealistic appearances of virtual clothing. Indeed, because of the complexity of synthesizing entire digital images to depict garment textures, these conventional systems often fail to properly account for bounds between different textures of a digital image, which often results in one texture blurring or bleeding into another. These conventional systems therefore generate images with deformed garment textures that exceed and/or do not adequately fill proper bounds of where the garment should fit.

In addition to their inaccuracy, many conventional digital image systems are also inefficient. To elaborate, many conventional systems rely on three-dimensional information pertaining to a model and/or a clothing item to then render a two-dimensional digital image representing the clothing item on the model. Conventional systems often require large amounts of computer resources to store and process such three-dimensional information. As the numbers of digital images (for models and/or products) increases (e.g., for online stores or catalogs), the expense of these conventional systems becomes more onerous.

Beyond their inaccuracy and inefficiency, many conventional digital image systems are also inflexible. For example, conventional systems often depend on three-dimensional information relating to either a model, a product, or both to utilize for rendering a virtual try-on image. However, three-dimensional information for products and models can be difficult to obtain and expensive to generate, which limits the range of application for these conventional systems. Indeed, because many of these conventional systems are tied to three-dimensional information, these systems cannot accurately generate virtual try-on images where such information is unavailable, which, due to the scarcity of three-dimensional information, significantly reduces their utility.

Thus, there are several disadvantages with regard to conventional digital image systems.

SUMMARY

One or more embodiments described herein provide benefits and solve one or more of the foregoing or other problems in the art with systems, methods, and non-transitory computer readable media that can accurately generate virtual try-on images utilizing a unified neural network framework. In particular, the disclosed systems can utilize a two-stage neural network framework that includes a warping stage and a texture transfer stage to generate a virtual try-on digital image that depicts a product digital image modified to fit a shape and pose of a model digital image. To this end, the disclosed systems can implement a coarse-to-fine warping process to warp a product digital image to align with a shape and a pose of a model digital image. In addition, the disclosed systems can implement a texture transfer process to transfer a warped product digital image to fit a model digital image. The disclosed systems can thus efficiently, flexibly, and accurately generate virtual try-on images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 10 illustrates a table of improvements associated with the virtual try-on digital image generation system in accordance with one or more embodiments;

DETAILED DESCRIPTION

Figure 1:
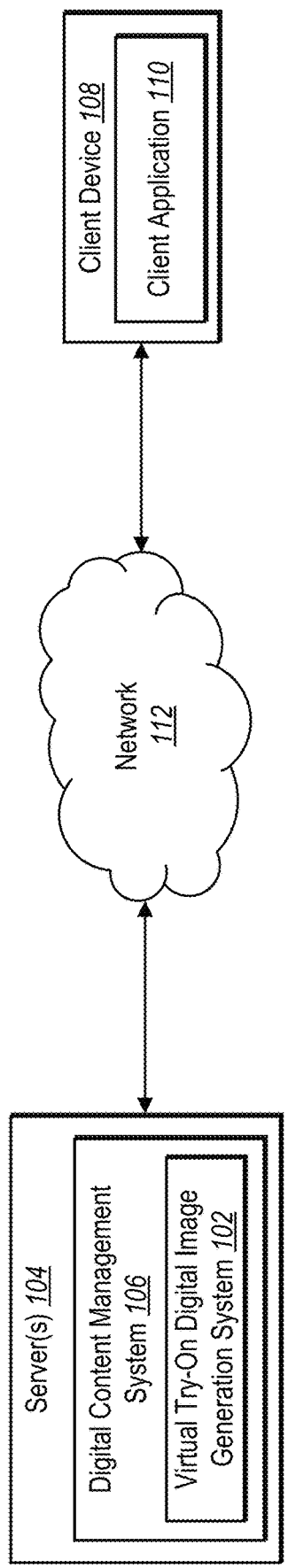
FIG. 1 illustrates an example system environment for implementing a virtual try-on digital image generation system in accordance with one or more embodiments.

One or more embodiments described herein provide benefits and solve one or more of the foregoing or other problems in the art with a virtual try-on digital image generation system that can generate virtual try-on digital images depicting products fit to model digital images utilizing a unified neural network framework. In particular, the virtual try-on digital image generation system can generate a virtual try-on digital image that depicts a model digital image with pixels replaced by a warped product digital image such that a model in the model digital image appears to be wearing a product from the product digital image. For example, the virtual try-on digital image generation system can utilize a coarse-to-fine warping process to warp a product digital image to fit a model digital image based on a pose and a shape of the model digital image. In addition, the virtual try-on digital image generation system can generate a virtual try-on digital image that depicts the warped product digital image on or combined with (e.g., replacing pixels of) the model digital image. For example, the virtual try-on digital image generation system can utilize a texture transfer process to fit the warped product digital image such that the warped product digital image aligns with, and replaces particular corresponding pixels of, the model digital image.

As just mentioned, the virtual try-on digital image generation system can generate a warped product digital image from an initial product digital image. More specifically, the virtual try-on digital image generation system can implement a coarse-to-fine warping process to warp the product digital image. To elaborate, the virtual try-on digital image generation system can utilize a coarse-to-fine warping process that consists of a two-stage warping procedure. First, the virtual try-on digital image generation system can determine coarse transformation parameters for coarse warping of the product digital image—i.e., to generate a coarse warped product digital image. Second, the virtual try-on digital image generation system can determine fine transformation parameters for fine warping of the product digital image to, combined with the coarse transformation parameters, generate a fine warped product digital image.

Regarding the coarse transformation parameters, the virtual try-on digital image generation system can utilize a coarse regression neural network to generate a coarse offset matrix that indicates coarse offsets or coarse transformation parameters. For example, the virtual try-on digital image generation system utilizes the coarse regression neural network to determine coarse modifications to make to portions of the product digital image to align the product digital image with a shape and a pose of the model digital image. Indeed, the virtual try-on digital image generation system can utilize a coarse regression neural network to analyze the product digital image along with digital image priors associated with the model digital image. For instance, the virtual try-on digital image generation system can generate digital image priors for the model digital image to determine a shape and a pose of the model digital image. Thus, the virtual try-on digital image generation system can utilize the digital image priors as guidance for aligning the product digital image with the model digital image.

In relation to the fine transformation parameters, the virtual try-on digital image generation system can utilize a fine regression neural network to generate a fine offset matrix that indicates fine offsets or fine transformation parameters. For example, the virtual try-on digital image generation system utilizes the fine regression neural network to determine fine modifications to make to portions of a product digital image to more closely align the product digital image with a shape and a pose of a model digital image. Indeed, the virtual try-on digital image generation system can determine additional fine modifications to make on top of the coarse modifications. Thus, within the coarse-to-fine warping process, the virtual try-on digital image generation system generates a coarse warped product digital image based on the coarse regression neural network and further generates a fine warped product digital image based on the fine regression neural network together with the coarse regression neural network.

Additionally, the virtual try-on digital image generation system can train the coarse regression neural network and the fine regression neural network. In particular, the virtual try-on digital image generation system can train both neural networks to accurately predict modifications to make to product digital images. For example, the virtual try-on digital image generation system can jointly train the coarse regression neural network and the fine regression neural network using one or more loss functions such as a perceptual geometric matching loss function.

As also mentioned above, the virtual try-on digital image generation system can generate a virtual try-on digital image that depicts a (fine) warped product digital image combined with a model digital image such that a model depicted in the model digital image appears to be wearing a product from the product digital image. In particular, the virtual try-on digital image generation system can utilize a texture transfer process that includes multiple constituent procedures to render a warped product digital image on top of (or in place of) particular pixels of a model digital image such that the product depicted within the product digital image appears realistically placed on a model of the model digital image. For example, the virtual try-on digital image generation system can generate a corrected (or conditional) segmentation mask based on a product digital image and digital image priors of a model digital image. In addition, the virtual try-on digital image generation system can utilize the corrected segmentation mask in addition to a product digital image and a fine warped version of the product digital image to generate an output of a virtual try-on digital image.

As mentioned, the virtual try-on digital image generation system can generate a corrected or conditional segmentation mask. In particular, the virtual try-on digital image generation system can generate an initial (non-corrected or non-conditional) segmentation mask based on digital image priors of a model digital image. The segmentation mask can indicate portions or pixels of the model digital image that are covered by a particular product. For example, the segmentation mask can delineate between which pixels are covered by a product within the model digital image and which pixels are covered by other textures. In some embodiments, the virtual try-on digital image generation system can represent pixels of the product (e.g., a shirt) with a first representation (e.g., a first color) and pixels corresponding to other textures (e.g., arms, pants, face) within the model digital image using different respective representations (e.g., different colors).

Based on the segmentation mask, the virtual try-on digital image generation system can utilize a neural network to generate a corrected segmentation mask. In particular, the virtual try-on digital image generation system can determine how to correct the initial segmentation mask based on a (fine) warped product digital image to indicate portions or pixels of the model digital image that are to be replaced by the warped product digital image. Indeed, the virtual try-on digital image generation system can modify the bounds of the initial segmentation mask to, for example, change the area of the model digital image that is to be replaced. For example, the virtual try-on digital image generation system can modify an initial segmentation mask depicting a short-sleeve-shirt-covered area to generate a corrected segmentation mask depicting a long-sleeve-shirt-covered area (for a product digital image of a long sleeve shirt) to be replaced.

To this end, the virtual try-on digital image generation system can train the neural network to generate accurate corrected segmentation masks based on model digital image priors, product digital images, and ground truth segmentation masks.

Additionally, the virtual try-on digital image generation system can generate a virtual try-on digital image based on a corrected segmentation mask, a fine warped product digital image, and a model digital image. For example, the virtual try-on digital image generation system can translate a texture of the fine warped product digital image onto the model digital image in accordance with the pixels indicated by the corrected segmentation mask that are to be replaced. Indeed, the virtual try-on digital image generation system can train a neural network to generate accurate try-on digital images based on one or more loss functions such as a dueling triplet loss.

The virtual try-on digital image generation system can provide several advantages over conventional digital image systems. For example, the virtual try-on digital image generation system is more accurate than conventional systems. In particular, by utilizing a corrected segmentation mask that more clearly delineates bounds of pixels to be replaced by a product digital image, the virtual try-on digital image generation system is less prone to generating try-on digital images with bleeding or blurry pixels as compared to conventional systems. In addition, the virtual try-on digital image generation system can more accurately render a warped product digital image onto a model digital image by utilizing a coarse-to-fine warping process, whereby the virtual try-on digital image generation system identifies fine-grained shaped intricacies of a product digital image for modifying to fit a model digital image.

In addition, the virtual try-on digital image generation system is more efficient than conventional digital image systems. Whereas many conventional systems process resource-intensive three-dimensional information for a model and/or a product to generate try-on renders, the virtual try-on digital image generation system can utilize two-dimensional digital image information which is less resource-intensive. Indeed, because processing two-dimensional information requires fewer parameters than processing three-dimensional information, the virtual try-on digital image generation system requires fewer computer resources such as computing time, processing power, and memory.

On top of improved accuracy and efficiency, the virtual try-on digital image generation system is also more flexible than conventional digital image systems. In contrast with many conventional systems that are tied to three-dimensional information (which is very model-specific or product-specific and is sometimes difficult to obtain), the virtual try-on digital image generation system is capable of generating a more generalized framework for rendering try-on digital images. Indeed, by utilizing more widely available and more flexible two-dimensional information, the virtual try-on digital image generation system can determine generalized versions of texture transfers that can be adapted for different model digital images and/or different product digital images.

As illustrated by the foregoing discussion, the present disclosure utilizes a variety of terms to describe features and benefits of the virtual try-on digital image generation system. Additional detail is hereafter provided regarding the meaning of these terms as used in this disclosure. In particular, the term "digital image" refers to a digital visual representation (e.g., a visual portrayal of an object, a scene, or a person). A digital image can include a plurality of pixels that depict individual colors. A digital image can include a single still image or multiple digital images such as frames of a digital video. In some embodiments, a digital image can include a "model digital image" that depicts a person or a model. For example, a model digital image can include representation of a particular person such as an uploaded digital image of a user. In these or other embodiments, a digital image can include a "product digital image" depicting a particular product such as an item of clothing (e.g., a shirt, pants, or a hat) or some other product such as glasses, a purse, or jewelry. Additionally, a digital image can include a "virtual try-on digital image" (or "try-on digital image") that refers to a digital image that depicts a model digital image with pixels replaced by a product of a product digital image. For example, a virtual try-on digital image can portray a model of a model digital image such that the model appears to be wearing a product of a (warped) product digital image.

As mentioned, the virtual try-on digital image generation system can determine transformation parameters associated with a product digital image. As used herein, the term "transformation parameter" refers to an operation, displacement, or transformation that the virtual try-on digital image generation system can apply to a portion of a digital image to change its appearance. Indeed, transformation parameters can include a transformation that describes a relationship between an initial appearance of a pixel (or group of pixels) and a resultant appearance after applying the transformation parameters. Transformation parameters can include coarse transformation parameters corresponding to coarse modifications to make to a product digital image and/or fine transformation parameters corresponding to fine modifications to make to a product digital image.

To determine transformation parameters, the virtual try-on digital image generation system can utilize a regression neural network to generate an offset matrix. For example, the virtual try-on digital image generation system can utilize a coarse regression neural network to generate a coarse offset matrix. Similarly, the virtual try-on digital image generation system can utilize a fine regression neural network to generate a fine offset matrix. As used herein, the term "offset matrix" (e.g., a "coarse offset matrix" or a "fine offset matrix") refers to a matrix of transformation parameters. For example, an offset matrix can include a number of different offsets or other transformations to apply to a portion of a product digital image to modify its appearance.

Relatedly, the term "neural network" refers to a machine learning model that can be trained and/or tuned based on inputs to determine classifications or approximate unknown functions. In particular, the term neural network can include a model of interconnected artificial neurons (e.g., organized in layers) that communicate and learn to approximate complex functions and generate outputs (e.g., determinations of digital image classes) based on a plurality of inputs provided to the neural network. In addition, a neural network can refer to an algorithm (or set of algorithms) that implements deep learning techniques to model high-level abstractions in data. To illustrate, a neural network can include a deep convolutional neural network that includes constituent components (made up of one or more layers) such as an encoder, a decoder, a SoftMax layer, and an output layer.

As mentioned, the virtual try-on digital image generation system can train neural networks to generate warped product digital images, segmentation masks, and virtual try-on digital images. As used herein, the term "train" (or "trained" or "training") refers to utilizing information to tune or teach a neural network by, for example, adjusting one or more weights or parameters of the neural network.

As further mentioned, the virtual try-on digital image generation system can generate digital image priors for use in various stages of generating a virtual try-on digital image such as determining a pose and a shape of a model digital image. As used herein, the term "digital image prior" (or simply "prior") refers to particular information relating to a digital image such as an indication of a shape or a pose of a model within a model digital image. Indeed, the virtual try-on digital image generation system can determine digital image prior indicating shapes in the form of an outline of a model or figure within a model digital image. The virtual try-on digital image generation system can also determine pose priors indicating locations of particular anchor points or portions (e.g., shoulders, elbows, hips, neck, head, and hands) of a model within a model digital image.

Additionally, the virtual try-on digital image generation system can generate a segmentation mask based on a model digital image. As used herein, the term "segmentation mask" refers to a representation or indication of different segments or portions within a digital image. For example, a segmentation mask can indicate a difference between depicted textures such as a clothing texture, a skin texture, and a background texture shown in a model digital image. In some embodiments, a segmentation mask delineates bounds between a portion of a digital image to be replaced (e.g., pixels that depict a shirt to be replaced by a different shirt of a product digital image) and other portions not to be replaced (e.g., pixels that depict pants or arms or neck). A "corrected segmentation mask (or "conditional segmentation mask") refers to a segmentation mask that has been corrected or conditioned based on a product digital image. For example, a corrected segmentation mask includes a segmentation mask where the initial portion to be replaced depicted a short-sleeve shirt and the corrected portion to be replaced depicts a long sleeve shirt.

Additional detail regarding the virtual try-on digital image generation system will now be provided with reference to the figures. For example, FIG. 1 illustrates a schematic diagram of an example system environment or overall system for implementing a virtual try-on digital image generation system 102 in accordance with one or more embodiments. An overview of the virtual try-on digital image generation system 102 is described in relation to FIG. 1. Thereafter, a more detailed description of the components and processes of the virtual try-on digital image generation system 102 is provided in relation to the subsequent figures.

As shown, the system environment includes server(s) 104, a client device 108 and a network 112. Each of the components of the system environment can communicate via the network 112, and the network 112 may be any suitable network over which computing devices can communicate. Example networks are discussed in more detail below in relation to FIG. 14.

As mentioned, the system environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to request generation of a virtual try-on digital image. Thus, the virtual try-on digital image generation system 102 on the server(s) 104 can receive information or instructions to generate a virtual try-on digital image based on the input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including one or more digital images and/or user interface elements to edit or otherwise interact with a digital image(s). For example, the client application 110 can present an online catalog of model digital images and product digital images for browsing. A user can interact with the client application 110 to provide user input to, for example, change a product worn by a model in a model digital image (e.g., an uploaded digital image of the user).

As illustrated in FIG. 1, the system environment includes the server(s) 104. The server(s) 104 may generate, track, store, process, receive, and transmit electronic data, such as model digital images, product digital images, and virtual try-on digital images. For example, the server(s) 104 may receive data from the client device 108 in the form of a request to generate a virtual try-on digital image. In addition, the server(s) 104 can transmit data to the client device 108 to provide a virtual try-on digital image. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a digital content management server.

As shown in FIG. 1, the server(s) 104 can also include the virtual try-on digital image generation system 102 as part of a digital content management system 106. The digital content management system 106 can communicate with the client device 108 to generate, modify, and transmit digital content, such as model digital images, product digital images, and virtual try-on digital images. In addition, the digital content management system 106 and/or the virtual try-on digital image generation system 102 can train one or more neural networks such as regression neural networks and/or convolutional neural networks to perform coarse-to-fine warping and texture transfer.

Although FIG. 1 depicts the virtual try-on digital image generation system 102 located on the server(s) 104, in some embodiments, the virtual try-on digital image generation system 102 may be implemented by (e.g., located entirely or in part) on one or more other components of the system environment. For example, the virtual try-on digital image generation system 102 may be implemented by the client device 108 and/or a third-party device.

In some embodiments, though not illustrated in FIG. 1, the system environment may have a different arrangement of components and/or may have a different number or set of components altogether. For example, the client device 108 may communicate directly with the virtual try-on digital image generation system 102, bypassing the network 112. The system environment can also include a database or repository for storing digital images and other information.

Additionally, the system environment can include one or more neural networks as part of the virtual try-on digital image generation system 102, stored within a database, included as part of the client application 110, or hosted on the server(s) 104.

Figure 2B:
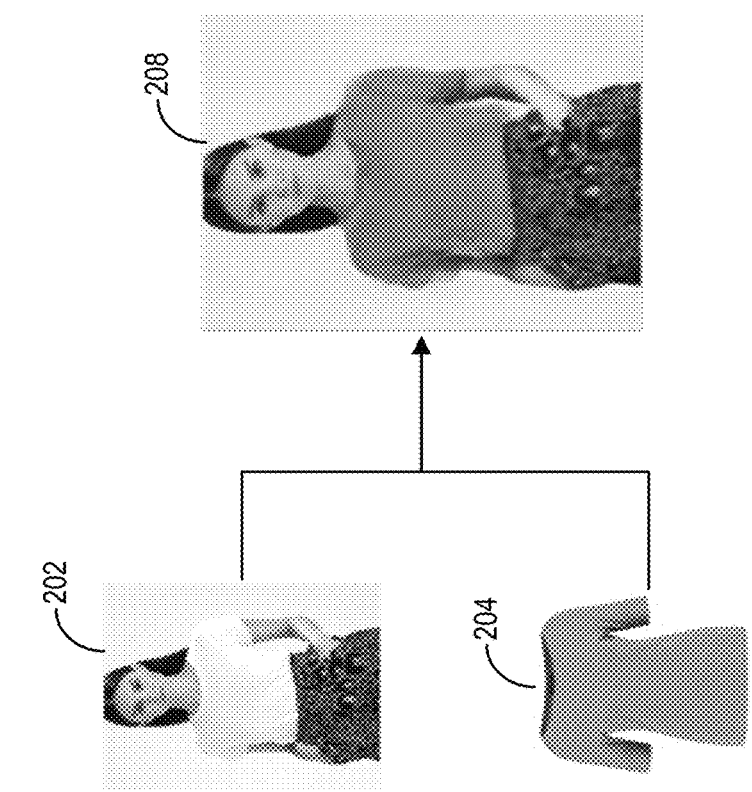
FIG. 2B illustrates an accurate virtual try-on digital image generated by the virtual try-on digital image generation system in accordance with one or more embodiments.
Figure 2A:
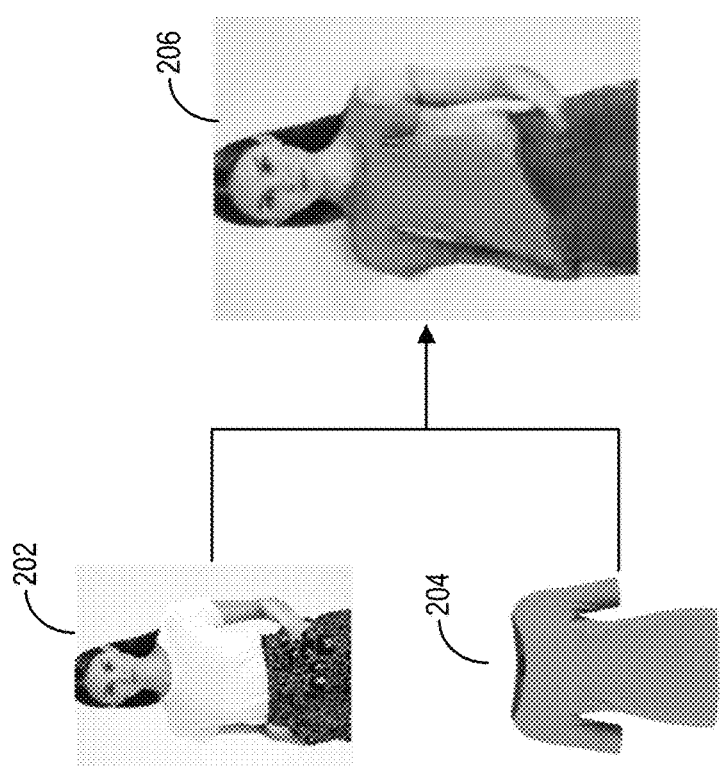
FIG. 2A illustrates a flawed virtual try-on digital image generated by a conventional digital image system in accordance with one or more embodiments.

As mentioned, the virtual try-on digital image generation system 102 can generate a virtual try-on digital image as a combination of a model digital image and a product digital image such that a depicted model appears to be wearing the product of the product digital image. The virtual try-on digital image generation system 102 can generate a virtual try-on digital image that is more realistic and accurate than conventional baseline digital image systems. For example, FIG. 2A illustrates a representation of a flawed, conventional virtual try-on digital image generated by a conventional digital image system. FIG. 2B illustrates a more realistic virtual try-on digital image generated by the virtual try-on digital image generation system 102 in accordance with one or more embodiments.

As shown in FIG. 2A, the conventional system generates a conventional virtual try-on digital image 206 where the shirt texture is blurry, bleeding below the pant line, and missing in portions of the model's hip, side, and shoulder. In addition, the conventional system fails to preserve the texture of the skirt in the model digital image 202. As shown in the conventional virtual try-on digital image 206, the skirt is generic and grey whereas the original skirt is patterned. Indeed, the conventional system attempts to combine the product digital image 204 of a shirt with the model digital image 202, but due to the disadvantages of conventional systems described above, the resultant conventional virtual try-on digital image 206 is not accurate nor realistic.

As shown in FIG. 2B, by contrast, the virtual try-on digital image generation system 102 generates a virtual try-on digital image 208 that is both accurate and realistic. Indeed, the virtual try-on digital image generation system 102 combines the model digital image 202 with the product digital image 204 to generate the virtual try-on digital image 208 that shows the model of the model digital image 202 wearing the shirt of the product digital image 204. As shown, the virtual try-on digital image 208 accurately represents the shirt of the product digital image 204 warped to fit a shape and a pose of the model in the model digital image 202, without blurry or bleeding portions. In addition, the virtual try-on digital image 208 preserves the texture of the skirt from the model digital image 202 to create a more accurate representation of a complete outfit. Indeed, users often want to virtually try-on shirts or other products to see how they complement an outfit as a whole, which is rendered possible by preserving the textures of the other components of the model digital image 202 by the virtual try-on digital image generation system 102.

Figure 3:
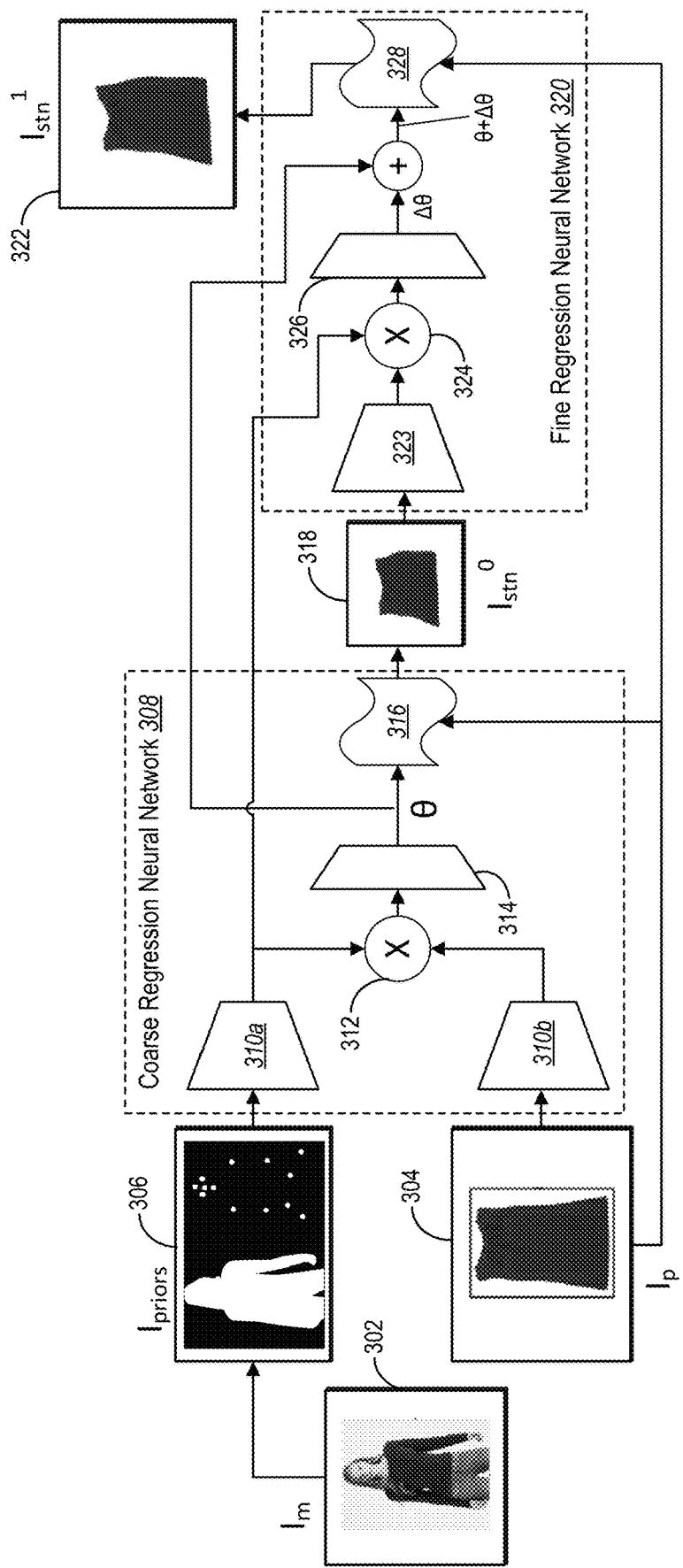
FIG. 3 illustrates a coarse-to-fine warping process in accordance with one or more embodiments.

To generate the virtual try-on digital image 208, the virtual try-on digital image generation system 102 can utilize multiple processes or methods together. For example, the virtual try-on digital image generation system 102 can utilize a coarse-to-fine warping process and a texture transfer process. Indeed, the virtual try-on digital image generation system 102 can utilize a coarse-to-fine warping process to generate a warped product digital image to fit a model digital image. FIG. 3 illustrates a coarse-to-fine warping process that the virtual try-on digital image generation system 102 utilizes to generate a fine warped product digital image 322 in accordance with one or more embodiments.

As illustrated in FIG. 3, the virtual try-on digital image generation system 102 utilizes a coarse regression neural network 308 and fine regression neural network 320 as a multi-stage coarse-to-fine process for generating the fine warped product digital image 322. Indeed, in one or more embodiments, the description of FIG. 3, including the disclosed algorithms, provide the corresponding structure for performing a step for coarse-to-fine warping of the product digital image 304 to align with the model digital image 302.

As shown, the virtual try-on digital image generation system 102 identifies or receives a model digital image 302 ($I_m$) and a product digital image 304 ($I_p$). In particular, the virtual try-on digital image generation system 102 can access the model digital image 302 and the product digital image 304 from a repository of digital images. In some embodiments, the virtual try-on digital image generation system 102 receives the model digital image 302 as an upload from the client device 108 or captures the model digital image 302 via the client device 108. In one or more embodiments, the virtual try-on digital image generation system 102 identifies the product digital image 304 from a website or an online catalog of product digital images. The virtual try-on digital image generation system 102 can further receive user input selecting the product digital image 304 and the model digital image 302 and requesting a virtual try-on digital image depicting the model of the model digital image 302 wearing the shirt of the product digital image 304.

In addition, the virtual try-on digital image generation system 102 accesses or determines digital image priors 306 ($I_{priors}$) for the model digital image 302. For example, the virtual try-on digital image generation system 102 determines shape priors as an outline of a shape of a model in the model digital image 302 and pose priors as locations of anchor points for joints or other portions of the model in the model digital image 302. As shown in FIG. 3, the virtual try-on digital image generation system 102 determines shape priors in the form of a white silhouette outlining the shape of the model in the model digital image 302. The virtual try-on digital image generation system 102 also determines pose priors in the form of points indicating particular portions of the model in the model digital image 302 such as a chin, a head, shoulders, hands, and hips to give an indication of the pose of the model. The digital image priors 306 can leave out effects of clothes (like color, texture, and shape), while preserving the person's face, hair, body shape, and pose.

In some embodiments, the digital image priors 306 are a 19-channel map of pose and body-shape map that the virtual try-on digital image generation system 102 generates using the model digital image 302 to overcome the unavailability of training triplets. For example, the digital image priors 306 can comprise a pose heatmap and a body representation.

The pose heatmap can comprise an 18-channel feature map with each channel corresponding to a human pose keypoint. To leverage the spatial layout, the virtual try-on digital image generation system 102 can transform each keypoint into a heatmap, with and 11×11 neighborhood around the keypoint filled with ones and zeroes everywhere else. In one or more embodiments, the virtual try-on digital image generation system generates the pose heatmap using a pose estimator, such as that described by Z. Cao, T. Simon, S.-E. Wei, and Y. Sheik in *Realtime Multi-person 2D Pose Estimation Using Part Affinity Fields* in CVPR, 2017, the entire contents of which are hereby incorporated by reference in their entirety.

The body representation can comprise a one channel feature map of a blurred binary mask that roughly covers the shape of the person's body. The virtual try-on digital image generation system generates the body representation using a human parser to compute a human segmentation map, where different regions represent different parts of the human body (e.g., arms, legs). The virtual try-on digital image generation system can convert the human segmentation map to a 1-channel binary mask where ones indicate the human body. In one or more embodiments, the virtual try-on digital image generation system uses a human parser to generate the body representation, such as that described by K. Gong, X. Liang, X. Shen, and L. Lin in *Look into person: Self-supervised structure-sensitive learning and a new benchmark for human parsing* in CVPR, 2017, the entire contents of which are hereby incorporated by reference in their entirety.

As further illustrated in FIG. 3, the virtual try-on digital image generation system 102 inputs the digital image priors 306 and the product digital image 304 into a coarse regression neural network 308. Based on analyzing the digital image priors 306 and the product digital image 304 using its various constituent components/layers, the coarse regression neural network 308 outputs a coarse warped product digital image 318. In particular, the virtual try-on digital image generation system 102 generates the coarse warped product digital image 318 by (coarsely) modifying one or more portions of the product digital image 304 in accordance with coarse transformation parameters learned by the coarse regression neural network 308. For example, the virtual try-on digital image generation system 102 modifies the product digital image 304 by moving portions to align with a shape and a pose of the model digital image 302 (as indicated by the digital image priors 306).

To elaborate, the virtual try-on digital image generation system 102 inputs the digital image priors 306 into a convolutional encoder 310a of the coarse regression neural network 308, whereupon the convolutional encoder 310 encodes, extracts, or generates feature representations (e.g., including observable and/or hidden latent features) for the digital image priors 306. Additionally, the virtual try-on digital image generation system 102 inputs the product digital image 304 into a convolutional encoder 310b, whereupon the convolutional encoder 310b encodes, extracts, or generates feature representations for the product digital image 304.

As shown, the virtual try-on digital image generation system 102 further utilizes a feature correlation 312 to correlate and/or combine features of the digital image priors 306 and the product digital image 304. Thus, the virtual try-on digital image generation system 102 generates a combined feature representation for the product digital image 304 and the digital image priors 306 (or, by association, the model digital image 302). The virtual try-on digital image generation system 102 further utilizes a regressor 314 to determine coarse transformation parameters B that indicate coarse modifications to make to the product digital image 304 to align portions of the depicted shirt with the pose and shape of the digital image priors 306.

In some embodiments, the virtual try-on digital image generation system 102 utilizes the coarse regression neural network 308 to generate the coarse transformation parameters θ in the form of a coarse offset matrix. In particular, the virtual try-on digital image generation system 102 generates a coarse offset matrix that includes coarse modifications for modifying portions of the product digital image to align with a pose and a shape of the model digital image. Indeed, different fields of the coarse offset matrix can include different offsets or other transformation parameters that indicate how to modify respective portions of the product digital image 304.

Based on the coarse transformation parameters θ, the virtual try-on digital image generation system 102 further utilizes a thin-plate spline spatial transformer 316 to generate the coarse warped product digital image 318. In particular, the virtual try-on digital image generation system 102 utilizes the thin-plate spline spatial transformer 316 to (coarsely) warp, transform, or modify portions of the product digital image 304 to align with the digital image priors 306 in accordance with the coarse transformation parameters B. In some embodiments, the virtual try-on digital image generation system 102 utilizes a thin-plate spline spatial transformer 316 as described by M. Jaderberg, K. Simonyan, A. Zisserman, and K. Kavukcuoglu in *Spatial Transformer Networks*, Advances in Neural Information Processing Systems, 2017-25 (2015), which is incorporated by reference in its entirety. Two main differences, however, are that the virtual try-on digital image generation system 102 learns the transformation parameters θ and θ+Δθ in a two-stage cascaded structure and utilizes a novel perceptual geometric matching loss for training.

Based on generating the coarse warped product digital image 318 ($I_{stm}^0$), the virtual try-on digital image generation system 102 can further generate a fine warped product digital image 322. In particular, the virtual try-on digital image generation system 102 can determine fine modifications or fine transformations to make to the coarse warped product digital image 318 to more closely align the depicted product with the shape and the pose of the digital image priors 306 (or, by association, the model digital image 302). As shown in FIG. 3, the virtual try-on digital image generation system 102 inputs the coarse warped product digital image 318 into a fine regression neural network 320 to generate the fine warped product digital image 322 ($I_{stm}^1$).

In particular, the virtual try-on digital image generation system 102 inputs the coarse warped product digital image 318 into a convolutional encoder 323 of the fine regression neural network 320. The convolutional encoder 323, in turn, encodes or generates a feature representations of the coarse warped product digital image 318 including observable features and/or hidden latent features. The virtual try-on digital image generation system 102 passes the features through a feature correlator 324 along with the digital image priors 306 to determine relationships or correlations between the features of the coarse warped product digital image 318 and the digital image priors 306.

Based on these relationships, the virtual try-on digital image generation system 102 can determine how much warping or transformation is still required to align with the digital image priors 306. Indeed, the virtual try-on digital image generation system 102 passes the correlated features/relationships to a regressor 326 to determine a difference or a change of the coarse warped product digital image 318 still required to align with the digital image priors 306. Thus, the virtual try-on digital image generation system 102 generates the coarse transformation parameters Δθ that indicate additional fine-level warping, modifying, or transforming of the coarse warped product digital image 318. In some embodiments, the virtual try-on digital image generation system 102 generates the fine transformation parameters Δθ in the form of a fine offset matrix that includes offsets or other transformations indicating what fine-level modifications to make to which respective portions of the coarse warped product digital image 318 (or the product digital image 304) to align with a pose and a shape of the digital image priors 306.

As shown in FIG. 3, the virtual try-on digital image generation system 102 further combines the coarse transformation parameters θ with the fine transformation parameters Δθ (e.g., by adding them together). By combining the transformation parameters, the virtual try-on digital image generation system 102 determines how to modify the product digital image 304 to generate the fine warped product digital image 322. To facilitate the expected hierarchical behavior, the virtual try-on digital image generation system 102 utilizes residual connections to offset the fine transformation parameters Δθ with the coarse transformation parameters θ. Additionally, as shown, the virtual try-on digital image generation system 102 inputs the product digital image 304 into the thin-plate spline spatial transformer 328 of the fine regression neural network 320 along with the combined transformation parameters θ+Δθ.

The thin-plate spline spatial transformer 328 thereby implements the modifications of the combined transformation parameters θ+Δθ to transform the product digital image 304 and generate the fine warped product digital image 322 that aligns with the shape and the pose of the model digital image 302. By transforming the product digital image 304 instead of the coarse warped product digital image 318, the virtual try-on digital image generation system 102 avoids artifacts that could otherwise result from applying the interpolation in the spatial transformer twice. In some embodiments, however the virtual try-on digital image generation system 102 can modify the coarse warped product digital image 318 to generate the fine warped product digital image 322.

By utilizing the coarse-to-fine warping process of FIG. 3, the virtual try-on digital image generation system 102 generates an accurate fine warped product digital image 322 that accounts for occlusion and pose variation. Indeed, in some cases, there may be large variations in shape or pose between a product digital image (e.g., the product digital image 304) and corresponding portions of a model digital image (e.g., the model digital image 302). Additionally, a model digital image may include occlusions where long hair or different poses cause portions of a garment (or other product/portion of the image to be replaced) is occluded or blocked from view. Unlike conventional systems, the virtual try-on digital image generation system 102 utilizes the above-described coarse-to-fine warping process to accommodate these occlusion and variation problems to nevertheless generate accurate warped product digital images.

As mentioned, the virtual try-on digital image generation system 102 can utilize coarse transformation parameters θ and fine transformation parameters Δθ to modify a product digital image to align with a model digital image (i.e., to generate a fine warped product digital image). To generate accurate, realistic warped product digital images, the virtual try-on digital image generation system 102 trains the coarse regression neural network 308 and the fine regression neural network 320. More specifically, because generating the fine warped product digital image 322 is based on the coarse transformation parameters Band the fine transformation parameters Δθ, the virtual try-on digital image generation system 102 trains the neural networks to accurately learn these parameters. Indeed, the virtual try-on digital image generation system 102 utilizes a novel loss function as part of the training process called a perceptual geometric matching loss function.

Figure 4:
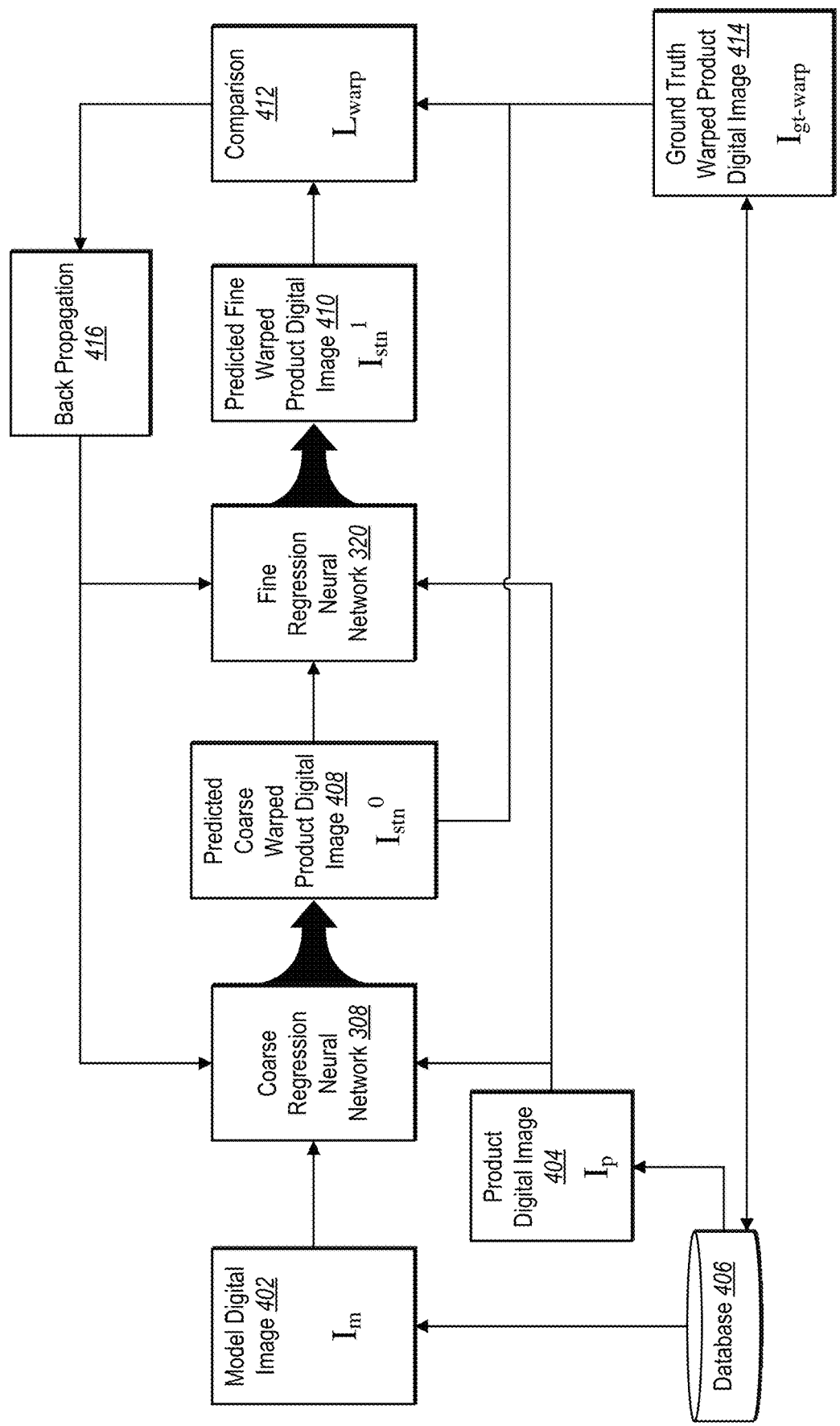
FIG. 4 illustrates jointly training a coarse regression neural network and a fine regression neural network in accordance with one or more embodiments.

FIG. 4 illustrates a training process for jointly training the coarse regression neural network 308 and the fine regression neural network 320 learn coarse transformation parameters θ and fine transformation parameters Δθ in accordance with one or more embodiments. In particular, the virtual try-on digital image generation system 102 accesses a model digital image 402 ($I_m$) and a product digital image 404 ($I_p$) from a database 406. The virtual try-on digital image generation system 102 inputs the model digital image 402 (or corresponding digital image priors) and the product digital image 404 into the coarse regression neural network 308. The coarse regression neural network 308 generates a prediction of how to (coarsely) warp the product digital image 404 to fit the model digital image 402—i.e., the coarse regression neural network 308 generates a predicted coarse warped product digital image 408.

In addition, the virtual try-on digital image generation system 102 inputs the product digital image 404 and the predicted coarse warped product digital image 408 into the fine regression neural network 320. The fine regression neural network 320 thereby generates a prediction of how to modify the product digital image 404 (based on coarse transformation parameters and fine transformation parameters) to align with the model digital image 402. The fine regression neural network 320 thus generates a predicted fine warped product digital image 410.

As shown, the virtual try-on digital image generation system 102 further performs a comparison 412 to compare the predicted coarse warped product digital image 408, the predicted fine warped product digital image 410, and a ground truth warped product digital image 414. Indeed, the virtual try-on digital image generation system 102 generates the ground truth warped product digital image 414 by segmenting out a portion of the model digital image 402 that depicts a particular product (e.g., a shirt) to be replaced by the product digital image. The virtual try-on digital image generation system 102 thus utilizes the segmented-out portion of the model digital image 402 as the ground truth warped product digital image 414. During training, the model digital image 402 and a product digital image 404 include the same product (e.g., shirt) so that the model digital image 402 can be used as a ground truth of how to warp the product in the product digital image 404.

The virtual try-on digital image generation system 102 performs the comparison 412 to determine an error or measure of loss associated with the coarse regression neural network 308 and the fine regression neural network 320. In particular, the virtual try-on digital image generation system 102 utilizes a particular loss function such as a warp loss (which includes perceptual geometric matching loss component) to determine the measure of loss associated with the predictions of the neural networks. Additional detail regarding the warp loss and the perceptual geometric matching loss is provided below with reference to FIG. 5.

Additionally, to improve the accuracy of the predictions, the virtual try-on digital image generation system 102 reduces or minimizes the measure(s) of loss associated with the coarse regression neural network 308 and the fine regression neural network 320. More specifically, the virtual try-on digital image generation system 102 utilizes back propagation 416 to reduce the measure of loss. For example, the virtual try-on digital image generation system 102 modifies or adjusts one or more weights or parameters associated with particular components or layers of the coarse regression neural network 308 and the fine regression neural network 320. By modifying the weights/parameters in this way, the virtual try-on digital image generation system 102 adjusts how the coarse regression neural network 308 and the fine regression neural network 320 learn transformation parameters via their respective components. Thus, upon subsequent training iterations, the coarse regression neural network 308 and the fine regression neural network 320 generate more accurate coarse warped predicted coarse warped product digital images and predicted fine warped product digital images.

Indeed, the virtual try-on digital image generation system 102 repeats the training process of FIG. 4 for multiple iterations or epochs. To elaborate, the virtual try-on digital image generation system 102 identifies additional model digital images and product digital images for subsequent training iterations. The virtual try-on digital image generation system 102 repeats the process of utilizing the coarse regression neural network 308 to generate predicted coarse warped product digital images, utilizing the fine regression neural network 320 to generate predicted fine warped product digital images, performing the comparison 412, and the back propagation 416. Through this joint training process, the virtual try-on digital image generation system 102 continuously modifies weights/parameters of the neural networks to learn accurate coarse transformation parameters $\theta$ and fine transformation parameters $\Delta\theta$ until the measure of loss associated with the neural networks satisfies a loss threshold (or until the predicted coarse and fine product digital images satisfy a an accuracy threshold).

Figure 5:
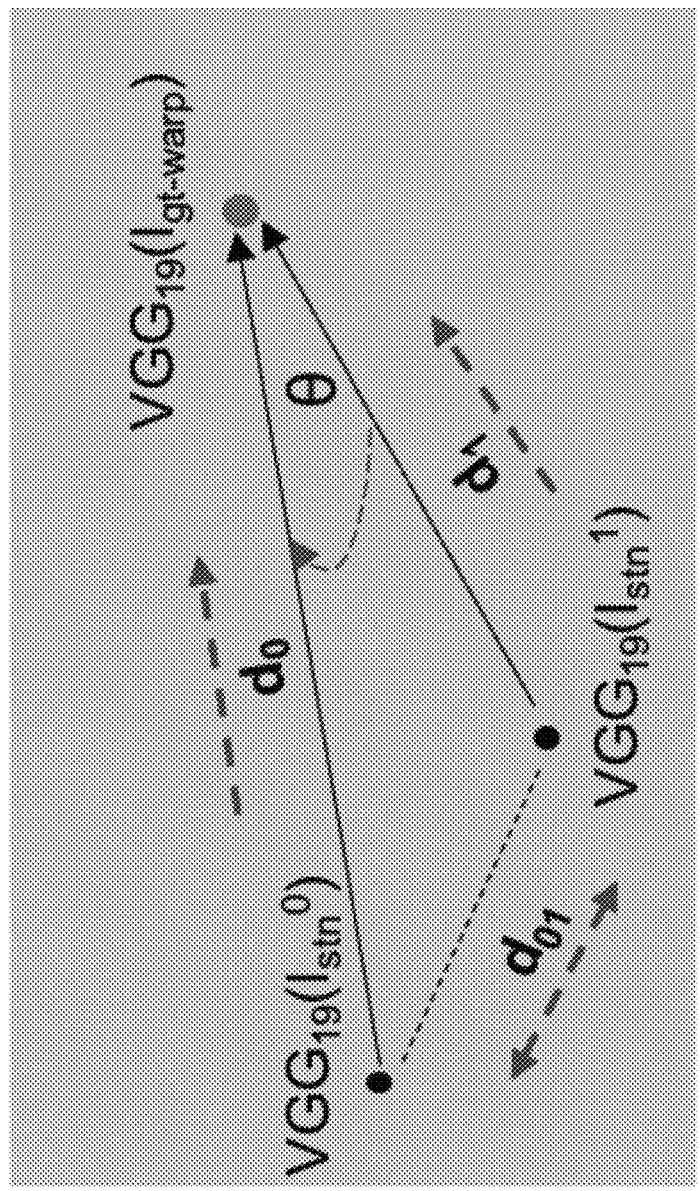
FIG. 5 illustrates a representation of feature space relationships for a perceptual geometric matching loss in accordance with one or more embodiments.

As mentioned above, the virtual try-on digital image generation system 102 can utilize a perceptual geometric matching loss as part of the comparison 412 to train the coarse regression neural network 308 and the fine regression neural network 320. FIG. 5 illustrates an example representation of implementing the perceptual geometric matching loss in accordance with one or more embodiments. As described above, the virtual try-on digital image generation system 102 generates feature representations for digital images utilizing the coarse regression neural network 308 and the fine regression neural network 320. In particular, the virtual try-on digital image generation system 102 generates feature representations of the predicted coarse warped product digital image 408, the predicted fine warped product digital image 410, and the ground truth warped product digital image 414.

As illustrated in FIG. 5, the virtual try-on digital image generation system 102 further compares the feature representations of these three digital images utilizing a perceptual geometric matching loss. More particularly, the virtual try-on digital image generation system 102 subjects the interim $I_{stn}^{0}$ (the predicted coarse warped product digital image 408) and final $I_{stn}^{1}$ (the predicted fine warped product digital image 410) output to a warp loss $L_{warp}$ against $I_{gt-warp}$ (the ground truth warped product digital image 414). The warp loss $L_{warp}$ includes a perceptual geometric matching loss component $L_{pgm}$. By utilizing the warp loss, the virtual try-on digital image generation system 102 causes the fine regression neural network 320 to incrementally improve upon the warping modifications (e.g., the coarse transformation parameters $\theta$) of the coarse regression neural network 308.

Indeed, FIG. 5 illustrates the respective feature representations of $I_{stn}^{0}$, $I_{stn}^{1}$, and $I_{gt-warp}$ in a VGG-19 feature space, where $d_0$, $d_1$, and $d_{01}$ represent distances or difference vectors between the feature representations in the feature space as shown. To elaborate, the virtual try-on digital image generation system 102 can utilize a warp loss function that includes a perceptual geometric matching loss, as represented by:

$$L_{warp} = \lambda_1 L_s^0 + \lambda_2 L_s^1 + \lambda_3 L_{pgm}$$

$$L_s^0 = |I_{gt-warp} - I_{stn}^0|$$

$$L_s^1 = |I_{gt-warp} - I_{stn}^1|$$

where $\lambda_n$ represents a respective weight, $I_{gt-warp} = I_m * M_{gt}^{product}$ and $L_{pgm}$ is the perceptual geometric matching loss. In addition, $I_{gt-warp}$ is the product depicted (worn) in the model digital image 402 ($I_m$) and $M_{gt}^{product}$ is the binary mask representing the product worn by the model in the model digital image 402.

The virtual try-on digital image generation system 102 can further determine the perceptual geometric matching loss $L_{pgm}$ in accordance with:

$$L_{pgm} = \lambda_4 L_{push} + \lambda_5 L_{align}$$

where $L_{push}$ represents a push loss that moves the second stage output IL relative to the ground-truth $I_{gt-warp}$ and $L_{align}$ represents an alignment loss associated with how aligned the second stage output $I_{stn}^{1}$ is relative to the ground-truth $I_{gt-warp}$.

In some embodiments, the virtual try-on digital image generation system 102 minimizes $L_{push}$ to push the second stage output IL closer to the ground-truth $I_{gt-warp}$ compared to the first stage output $I_{stn}^{0}$. The virtual try-on digital image generation system 102 can determine $L_{push}$ as given by:

$$L_{push} = k * L_s^1 - |I_{stn}^1 - I_{stn}^0|$$

where k is a scalar multiplicative margin that the virtual try-on digital image generation system 102 uses to ensure stricter bounds for the difference (e.g., k=3 is used for testing to obtain the results described below in relation to FIG. 10).

To determine $L_{push}$, the virtual try-on digital image generation system 102 maps $L_{push}$, $I_{stn}^{0}$, $I_{stn}^{1}$ and $I_{gt-warp}$ to the VGG-19 feature space. In addition, the virtual try-on digital image generation system 102 utilizes the loss to align the difference vectors between $I_{stn}^{0}$ and $I_{gt-warp}$ (the difference vector $d_0$) and between $I_{stn}^{1}$ and $I_{gt-warp}$ (the difference vector $d_1$). For example, in some embodiments the virtual try-on digital image generation system 102 aligns the difference vectors $d_0$ and $d_1$ by reducing or minimizing $d_{01}$, the difference vector between $I_{stn}^{0}$ and $I_{stn}^{1}$.

To minimize $L_{push}$, the virtual try-on digital image generation system 102 can minimize $L_{align}$ to help achieve this purpose. For example, the virtual try-on digital image generation system 102 can determine $L_{align}$ in accordance with:

$$d_0 = VGG(I_{sm}^0) - VGG(I_{gt-warp})$$

$$d_1 = VGG(I_{sm}^1) - VGG(I_{gt-warp})$$

$$L_{align} = (\text{CosineSimilarity}(d_0, d_1) - 1)^2$$

where $d_0$ and $d_1$ are the difference vectors shown in FIG. 5.

As mentioned above, the virtual try-on digital image generation system 102 can utilize a texture transfer process to generate a virtual try-on digital image by combining a fine warped product digital image with a model digital image such that the model in the model digital image appears to be wearing the product of the product digital image. The texture transfer process can include multiple stages, such as generation of a corrected segmentation mask (as described in relation to FIG. 6) and segmentation-assisted texture translation (as described in relation to FIG. 8). In one or more embodiments, the description of FIG. 6 (in conjunction with additional description of FIG. 8) provides the supporting structure (e.g., acts and algorithms) for performing a step for applying a texture transfer process to the warped product digital image and the model digital image to generate a virtual try-on digital image.

A key problem with many conventional systems is their inability to accurately honor the bounds of products and human skin, which causes product pixels to blur or bleed into the skin pixels (or vice-versa), and in the case of self-occlusion (such as with folded arms), skin pixels may get replaced entirely. This problem is exacerbated for cases where the product of a product digital image has a significantly different shape that a corresponding product to be replaced in a model digital image. Another scenario that aggravates this problem is when a model of a model digital image is in a complex pose. To help mitigate these problems of bleeding and self-occlusion, as well as accommodation of complex poses, the virtual try-on digital image generation system 102 utilizes a corrected (or conditional) segmentation mask prediction network.

Figure 6:
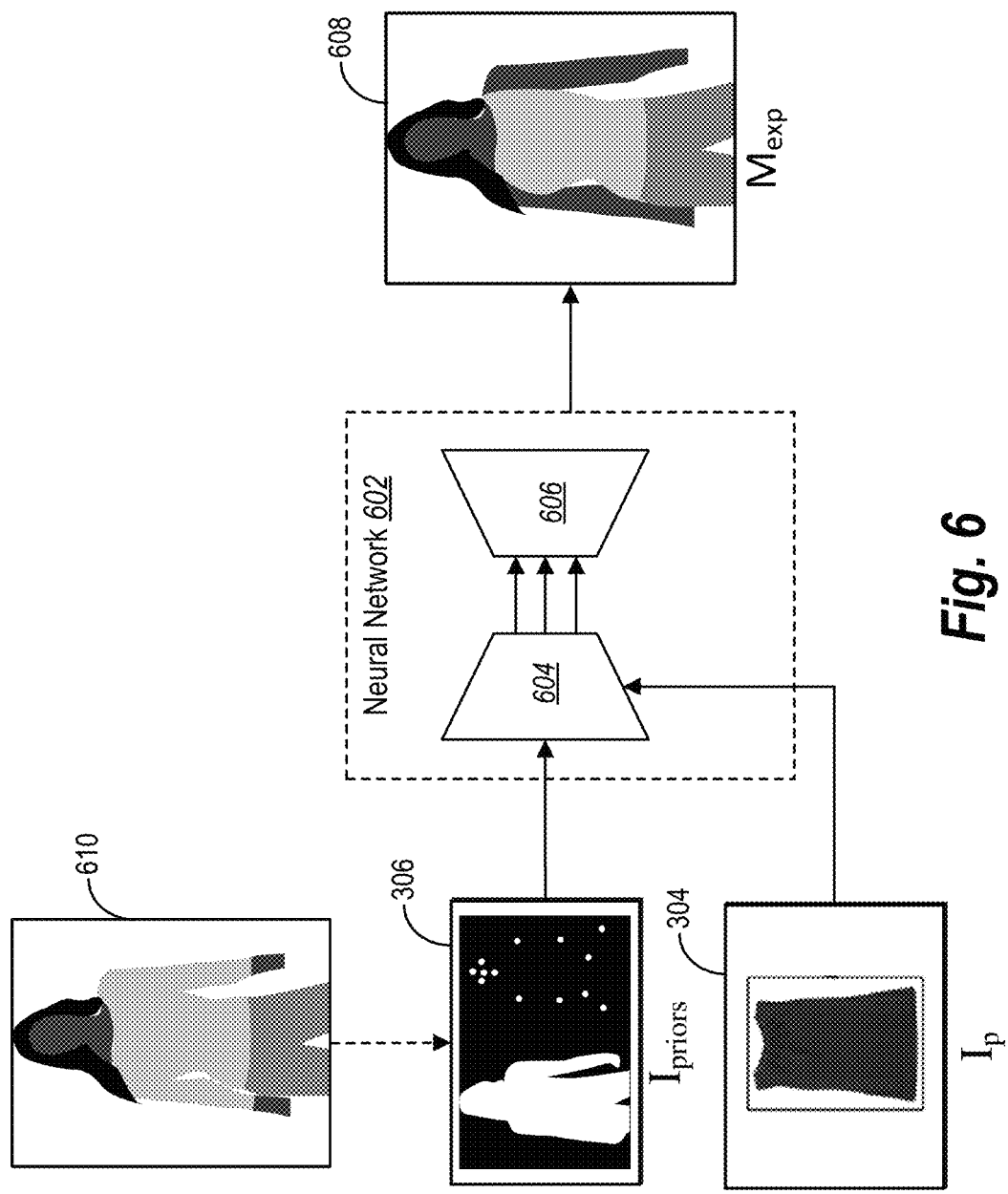
FIG. 6 illustrates generating a corrected segmentation mask in accordance with one or more embodiments.

Indeed, FIG. 6 illustrates utilizing a neural network 602 to generate a corrected segmentation mask 608 (e.g., an expected segmentation map $M_{exp}$) in accordance with one or more embodiments. For instance, to transfer the texture of the fine warped product digital image 322 onto the model digital image 302, the virtual try-on digital image generation system 102 can generate a segmentation mask for the model digital image 302 that indicates a portion (e.g., a number of pixels) of the model digital image 302 that are to be replaced with the texture of the fine warped product digital image 322. As shown in FIG. 6, the virtual try-on digital image generation system 102 thus generates a corrected segmentation mask 608 for the model digital image 302.

As illustrated in FIG. 6, the virtual try-on digital image generation system 102 utilizes the digital image priors 306 of the model digital image 302 along with the product digital image 304 to generate a corrected segmentation mask 608. The corrected segmentation mask 608 indicates those pixels of the model digital image 302 that are to be replaced by the fine warped product digital image 322. For instance, the light grey portion of the corrected segmentation mask 608 depicts a tank-top-shaped area that indicates a corresponding area of the model digital image 302 that is to be replaced by the warped product digital image 322. In addition, the corrected segmentation mask 608 clearly delineates bounds between various portions of the model digital image 302, as indicated by the various colors of the corrected segmentation mask 608 that each correspond to a different texture of the image.

To generate the corrected segmentation mask 608, the virtual try-on digital image generation system 102 determines how to modify a segmentation mask 610 associated with the digital image priors 306 (or the model digital image 302). Indeed, the virtual try-on digital image generation system 102 generates, identifies, or accesses the segmentation mask 610 that, based on the digital image priors 306, indicates portions of the model digital image 302 that are covered by (or depict) a particular product. For example, the segmentation mask 610 depicts a light grey portion (covering a torso area) that corresponds to the portion of the model digital image 302 that is covered by the long sleeve shirt. In one or more embodiments, the virtual try-on digital image generation system generates the segmentation mask 610 using a human parser to compute a segmentation map, where different regions represent different parts of the human body (e.g., arms, shirt, pants, legs). In one or more embodiments, the virtual try-on digital image generation system uses a human parser to generate the segmentation mask 610, such as that described by K. Gong, X. Liang, X. Shen, and L. Lin in *Look into person: Self-supervised structure-sensitive learning and a new benchmark for human parsing* in CVPR, 2017, the entire contents of which are hereby incorporated by reference in their entirety.

To modify, condition, or correct the segmentation mask 610 and generate the corrected segmentation mask 608, the virtual try-on digital image generation system 102 can utilize a neural network such as a convolutional neural network. Indeed, as shown in FIG. 6, the virtual try-on digital image generation system 102 inputs the digital image priors 306 and the product digital image 304 into the neural network 602, whereupon the neural network 602 outputs the corrected segmentation mask 608. In particular, the virtual try-on digital image generation system 102 utilizes the neural network 602 to determine relationships between the digital image priors 306 and the product digital image 304 to determine a portion of the model digital image 302 that is expected to be covered by the product digital image 304. For example, the neural network 602 determines classes for various portions of the model digital image 302 based on the digital image priors 306 and the product digital image 304—e.g., by classifying skin textures distinctly from hair textures, pants textures, shirt textures, and background textures.

For example, the virtual try-on digital image generation system 102 inputs the digital image priors 306 and the product digital image 304 into a convolutional encoder 604 that encodes or extracts features of the digital image priors 306 and the product digital image 304. In addition, the virtual try-on digital image generation system 102 passes the extracted features to an upsampling convolutional decoder 606 that generates (or causes to be generated) the corrected segmentation mask 608 based on the relationships between the features of the digital image priors 306 and the features of the product digital image 304. Although FIG. 6 illustrates just two components of the neural network 602 (the convolutional encoder 604 and the upsampling convolutional decoder 606), in some embodiments, the neural network 602 includes additional or alternative components or layers. For example, the neural network 602 can include a 12-layer U-Net-like architecture as described by O. Ronneberger, P. Fischer, and T. Brox in *U-Net: Convolutional Neural Networks for Biomedical Image Segmentation*, Int'l Conf. on Medical Image Computing and Computer-Assisted Intervention, 234-41 (2015), which is incorporated by reference herein in its entirety.

Figure 7:
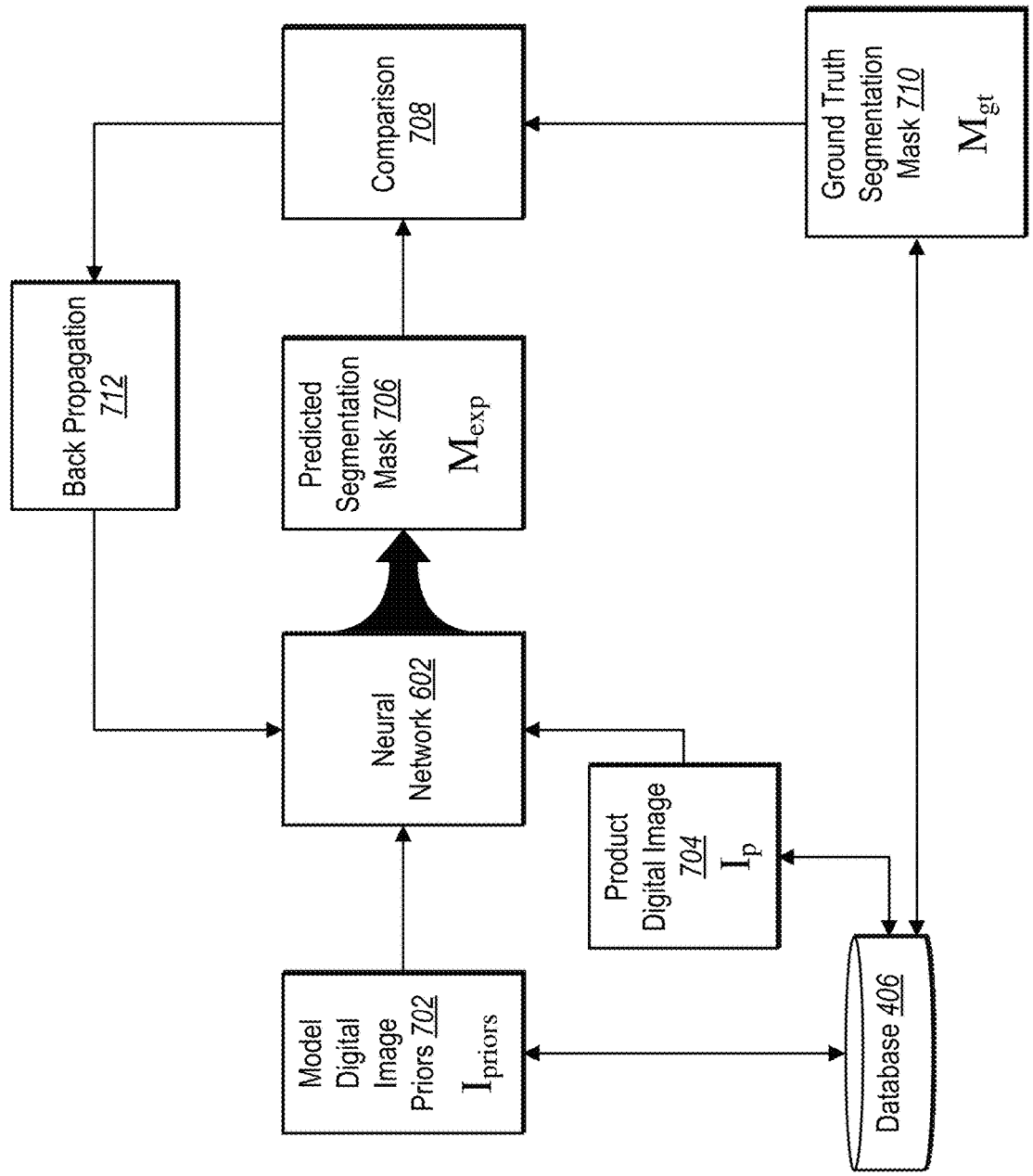
FIG. 7 illustrates training a neural network to generate accurate corrected segmentation masks in accordance with one or more embodiments.

To ensure that the neural network 602 accurately generates the corrected segmentation mask 608, the virtual try-on digital image generation system 102 can train the neural network 602. FIG. 7 illustrates training the neural network 602 in accordance with one or more embodiments. As shown, the virtual try-on digital image generation system 102 inputs, from the database 406, model digital image priors and a product digital image 704 into the neural network 602. The neural network 602 analyzes the model digital image priors 702 and the product digital image 704 to generate a predicted segmentation mask 706. The predicted segmentation mask 706 represents a prediction of what the neural network 602 expects for a segmentation mask according to its various weights and parameters.

Additionally, the virtual try-on digital image generation system 102 performs a comparison 708 to compare the predicted segmentation mask 706 with a ground truth segmentation mask 710. Indeed, the virtual try-on digital image generation system 102 accesses a ground truth segmentation mask 710 that corresponds to the model digital image priors 702 and/or the product digital image 704 from the database 406. Thus, the virtual try-on digital image generation system 102 can utilize a cross entropy loss function to compare the predicted segmentation mask 706 with the ground truth segmentation mask 710 to thereby determine a measure of loss associated with the neural network 602. For instance, the virtual try-on digital image generation system 102 can utilize a cross entropy loss function for semantic segmentation with increased weights for skin classes (to better handle occlusion cases) and background classes (to stem bleeding of skin pixels into other pixels).

Further, the virtual try-on digital image generation system 102 performs back propagation 712 to reduce or minimize the measure of loss determined via the comparison 708. In particular, the virtual try-on digital image generation system 102 modifies weights or parameters of various layers/components of the neural network 602 to adjust how the neural network 602 analyzes digital image priors and product digital images. As a result, neural network 602 utilizes the modified weights/parameters on subsequent training iterations to determine classes for various textures. Thus, after multiple training iterations or epochs, the virtual try-on digital image generation system 102 modifies the weights/parameters of the neural network 602 to the point where the neural network 602 generates accurate predicted segmentation masks (e.g., where the measure of loss satisfies a threshold).

Because the neural network 602 learns from sparse product-agnostic input (e.g., $I_{priors}$), that does not include effects of a model digital image (to avoid learning identity), the virtual try-on digital image generation system 102 can generalize to unseen models (e.g., model digital images other than those on which the neural network 602 is specifically trained). Indeed, the virtual try-on digital image generation system 102 is flexible enough to generate virtual try-on digital images for model digital images and product digital images that are not necessarily part of a set of training data.

Figure 8:
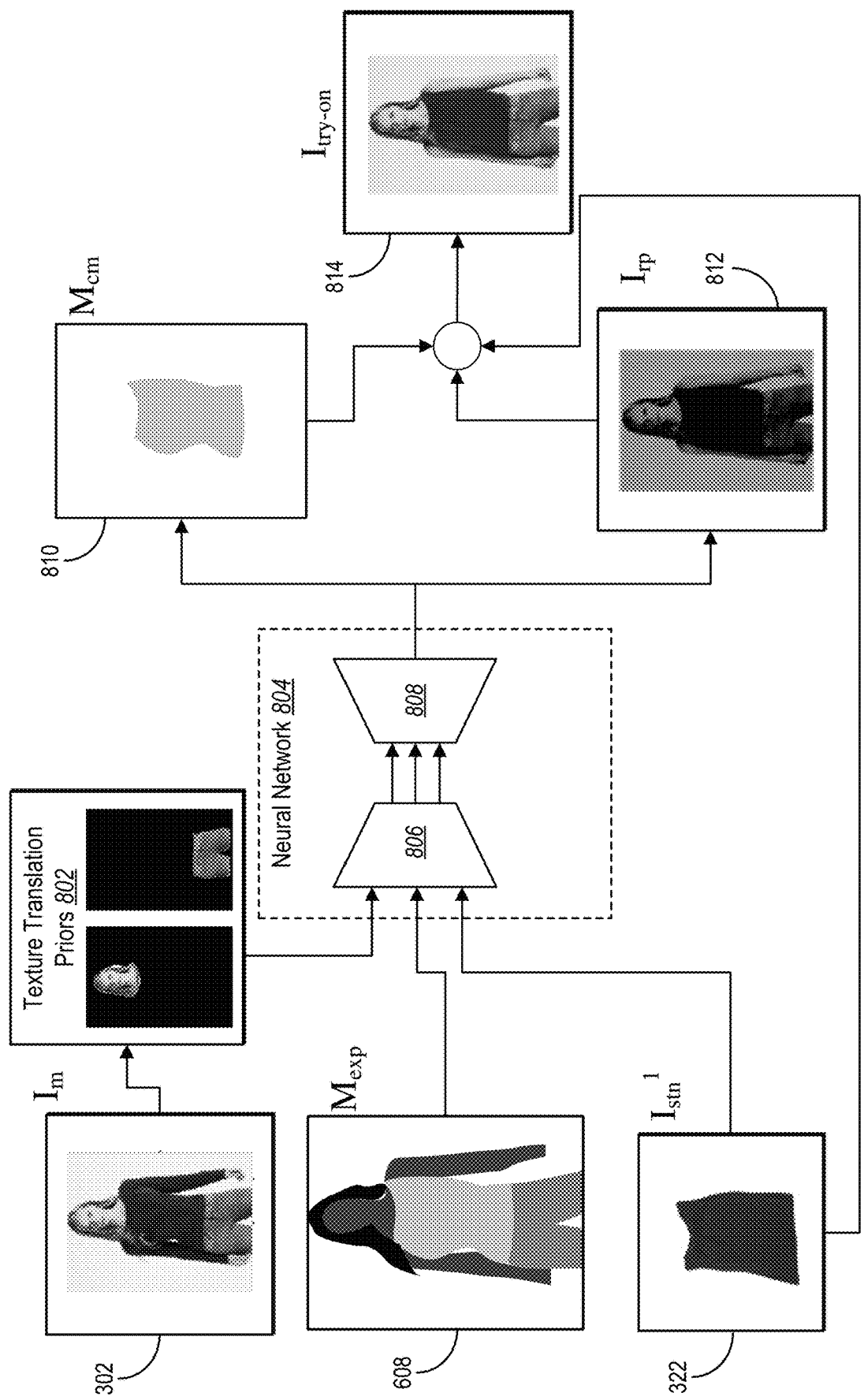
FIG. 8 illustrates generating a virtual try-on digital image in accordance with one or more embodiments.

As mentioned, the virtual try-on digital image generation system 102 can utilize the corrected segmentation mask 608 as part of generating a virtual try-on digital image where a model appears to be wearing a product of a product digital image. FIG. 8 illustrates generating a virtual try-on digital image 814 in accordance with one or more embodiments. As mentioned above, the description of FIG. 8, along with that of FIG. 6 (and other portions of this disclosure) can provide algorithms and structure for performing a step for applying a texture transfer process to the warped product digital image and the model digital image to generate a virtual try-on digital image.

As shown in FIG. 8, the virtual try-on digital image generation system 102 can utilize a neural network 804 to generate the virtual try-on digital image 814. More specifically, like the neural network 602 described above, the neural network 804 can include a 12-layer U-Net as described by O. Ronneberger et al. in *U-Net: Convolutional Neural Networks for Biomedical Image Segmentation*. For example, the virtual try-on digital image generation system 102 inputs the fine warped product digital image 322, the corrected segmentation mask 608, and texture translation priors 802 of the model digital image 302 into the neural network 804. The virtual try-on digital image generation system 102 generates or identifies the texture translation priors 802 which can include pixels of the model digital image 302 that are unaffected such as face pixels and pixels of a product not being replaced in the model digital image 302 (e.g., pants in the illustrated case). In one or more embodiments, the virtual try-on digital image generation system 102 generates the texture translation priors 802 using a human parser, such as that described by K. Gong, X. Liang, X. Shen, and L. Lin in *Look into person: Self-supervised structure-sensitive learning and a new benchmark for human parsing* in CVPR, 2017, the entire contents of which are hereby incorporated by reference in their entirety As shown, the virtual try-on digital image generation system 102 utilizes a convolutional encoder 806 to extract features relating to the texture translation priors 802, the corrected segmentation mask 608, and the fine warped product digital image 322. The virtual try-on digital image generation system 102 further pass these features through an upsampling convolutional decoder 808 (and/or other components/layers) to generate two outputs—an RGB rendered person image 812 and a composition mask 810. For example, the neural network 804 produces a 4-channel output where three channels are the R, G, and B values of the rendered person image 812, and the fourth channel is the composite mask 810.

Using these two outputs, the virtual try-on digital image generation system 102 further generates the virtual try-on digital image 814 by combining the composition mask 810, the rendered person image 812, and the fine warped product digital image 322. For example, the virtual try-on digital image generation system 102 generates the virtual try-on digital image 814 in accordance with:

$$I_{try\text{-}on}=M_{cm}*I_{stn}^{1}+(1-M_{cm})*I_{rp}$$

where $I_{try\text{-}on}$ represents the virtual try-on digital image 814, $M_{cm}$ represents the composite mask 810, $I_{stn}^{1}$ represents the fine warped product digital image 322, and $I_{rp}$ represents the RGB rendered person image 812. Because the virtual try-on digital image generation system 102 utilizes the unaffected parts of the model digital image 302 as a prior (e.g., the texture translation priors 802), the virtual try-on digital image generation system 102 is able to better translate texture of auxiliary (i.e., non-replaced) products such as pants/bottoms onto the virtual try-on digital image 814.

Figure 9:
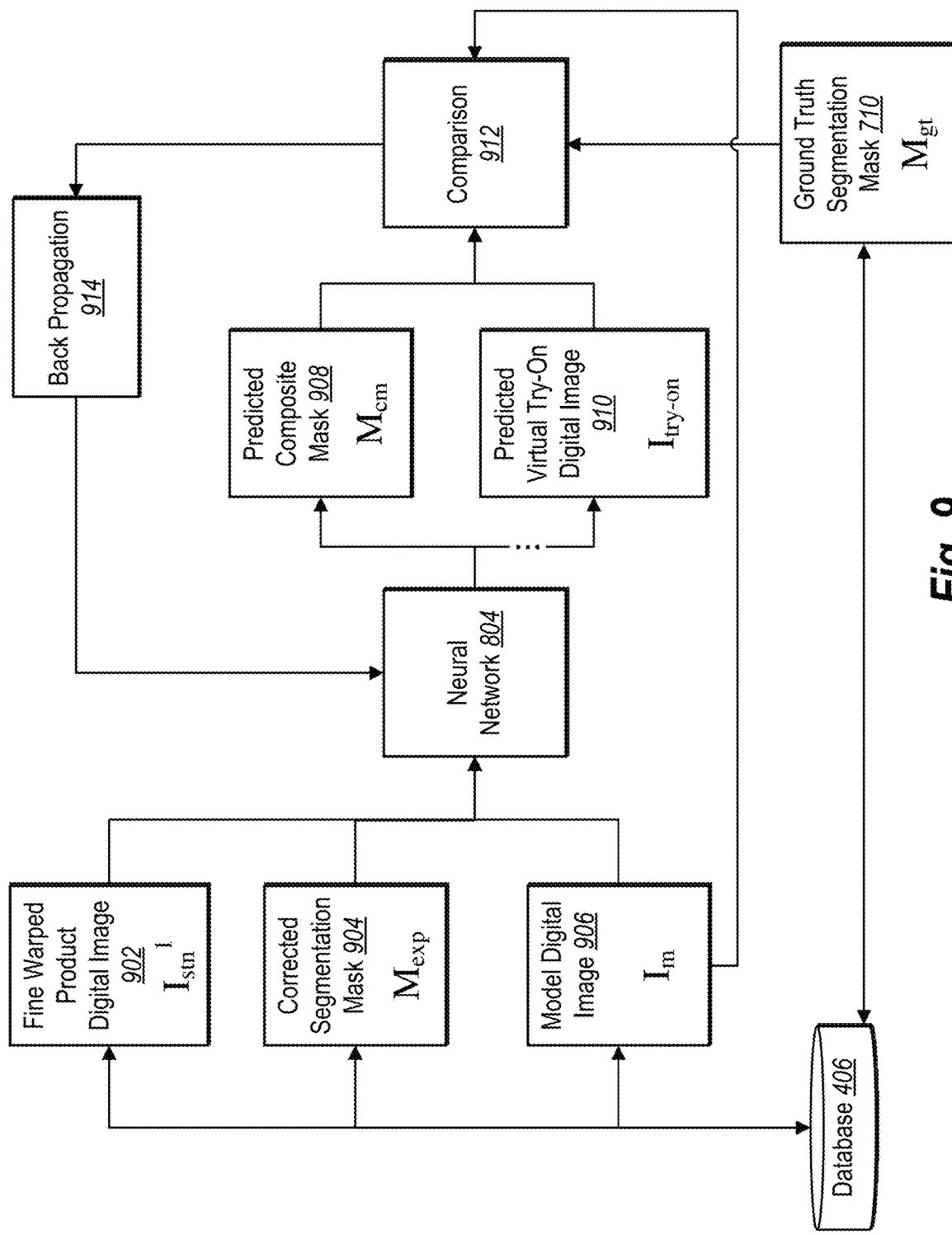
FIG. 9 illustrates training a neural network to generate accurate virtual try-on digital images in accordance with one or more embodiments.

To help ensure that the neural network 804 generates accurate virtual try-on digital images (e.g., the virtual try-on digital image 814), the virtual try-on digital image generation system 102 can train the neural network 804. FIG. 9 illustrates training the neural network 804 in accordance with one or more embodiments. As shown, the virtual try-on digital image generation system 102 accesses training data such as a fine warped product digital image 902, a corrected segmentation mask 904, and a model digital image 906 (or texture translation priors of the model digital image 906) to input into the neural network 804. Based on analyzing these three inputs, the neural network 804 generates a predicted composite mask 908 and (as described above in relation to FIG. 8) a predicted virtual try-on digital image 910 in accordance with the weights and parameters of the components and layers of the neural network 804.

The virtual try-on digital image generation system 102 further performs a comparison 912 to compare the predicted composite mask 908, the predicted virtual try-on digital image 910, and a ground truth segmentation mask 710 (accessed from the database 406). In particular, the virtual try-on digital image generation system 102 performs the comparison 912 by utilizing one or more loss functions such as a texture translation loss function and/or a dueling triplet loss function.

To elaborate, the virtual try-on digital image generation system 102 can implement a texture transfer loss, which includes other loss components such as a perceptual distance loss and a mask loss. For example, the virtual try-on digital image generation system 102 can determine a texture transfer loss as given by:

$$L_{tt}=L_{l1}+L_{percep}+L_{mask}$$

$$L_{l1}=|I_{try\text{-}on}-I_{m}|$$

$$I_{percep} = |VGG(I_{try-on}) - VGG(I_m)|$$

$$L_{mask} = |M_{cm} - M_{gt}^{product}|$$

where $L_{tt}$ represents the texture transfer loss, $L_{l1}$ represents an $L_1$ distance loss, $L_{percep}$ represents a perceptual distance loss, $L_{mask}$ represents a mask loss, VGG ($I_{try-on}$) represents a VGG-19 feature space representation of the predicted virtual try-on digital image 910, VGG($I_m$) represents a VGG-19 feature space representation of the model digital image 906, $M_{cm}$ represents the predicted composite mask 908, and $M_{gt}^{product}$ is the binary mask representing the product worn by the model in the model digital image 906.

As shown, the virtual try-on digital image generation system 102 also performs back propagation 914 to modify weights or parameters associated with the neural network 804. By modifying the weights/parameters, the virtual try-on digital image generation system 102 changes how the neural network 804 analyzes the inputs to generate outputs. Indeed, the virtual try-on digital image generation system 102 changes the interaction between various neurons or layers used for extracting features and determining relationships between features. Thus, upon multiple successive iterations or epochs of training with different inputs, repeating the comparison 912 and the back propagation 914 to continually modify the weights/parameters, the virtual try-on digital image generation system 102 reduces or minimizes the loss associated with the neural network 804 until it satisfies a threshold (and the neural network 804 therefore generates accurate predictions of composite masks and rendered person images).

In some embodiments, the virtual try-on digital image generation system 102 performs the training of FIG. 9 in multiple phases. The first K steps of training are a conditioning phase whereby the virtual try-on digital image generation system 102 minimizes (or reduces) $L_{tt}$ to produce reasonable results. In the subsequent phases (each lasting T steps), the virtual try-on digital image generation system 102 employs the $L_{tt}$ augmented with a dueling triplet loss to fine-tune the results further.

For example, the virtual try-on digital image generation system 102 implements a dueling triplet loss (e.g., as part of the comparison 912) that is characterized by an anchor, a positive (with respect to the anchor), and a negative (with respect to the anchor). In using the dueling triplet loss, the virtual try-on digital image generation system 102 attempts to simultaneously push the anchor result toward the positive and away from the negative. To this end, the virtual try-on digital image generation system 102 pits the anchor (e.g., the output from the neural network 804 with the current weights) against the negative (e.g., the output from the neural network 804 with weights from the previous phase), and push it toward the positive (e.g., the ground truth).

As training progresses, this online hard negative training strategy helps the virtual try-on digital image generation system 102 push the results closer to the ground truth by updating the negative at discrete step intervals (T steps). In the fine-tuning phase, at step i (i<K), the virtual try-on digital image generation system 102 determines the dueling triplet loss as:

$$i_{prev} = K + T * \left( \left\lfloor \frac{i-K}{T} \right\rfloor - 1 \right)$$

$$D_{neg}^i = |I_{try-on}^i - I_{try-on}^{i_{prev}}|$$

$$D_{pos}^i = |I_{try-on}^i - I_m|$$

$$L_d^i = \max(D_{pos}^i - D_{neg}^i, 0)$$

where $I_{try-on}^i$ is the virtual try-on digital image obtained from the neural network 804 with weights at the $i^{th}$ iteration, and where $L_d^i$ is the dueling triplet loss. In some embodiments, the virtual try-on digital image generation system 102 thus determines the overall loss for the neural network 804 as:

$$L_{try-on}^i = \begin{cases} L_{tt} & i \leq K \\ L_{tt} + L_d^i & i > K \end{cases}$$

where $L_{try-on}^i$ is the overall loss for the neural network 804.

As mentioned, the virtual try-on digital image generation system 102 can generate virtual try-on digital images with greater accuracy than conventional digital image systems. Indeed, experimenters have demonstrated the improvements of the virtual try-on digital image generation system 102 as compared to conventional systems. FIG. 10 illustrates an example table of some of the improvements of the virtual try-on digital image generation system 102 over conventional systems in accordance with one or more embodiments.

As shown in FIG. 10, the virtual try-on digital image generation system 102 utilizes a dataset for training and testing. In particular, the dataset can include 19,000 digital images of front-facing female models and corresponding upper-clothing isolated product digital images. There are 16,253 cleaned pairs which are split into a training set and a testing set of 14,221 and 2,032 pairs, respectively. The images in the testing set are rearranged into unpaired sets for qualitative evaluation and are kept paired for quantitative evaluation otherwise. In some embodiments, the virtual try-on digital image generation system 102 utilizes the dataset described by X. Han, Z. Wu, Z. Wu, R. Yu, and L. S. Davis in *VITON: An Image-Based Virtual Try-On Network*, CoRR (2017), which is incorporated by reference herein in its entirety.

In the table of FIG. 10, the results of different variations of the virtual try-on digital image generation system 102 are represented by the notations GMM+SATT, C2F+SATT, and C2F+SATT-D (e.g., "SieveNet"), where SATT represents the texture translation network (of FIGS. 6 and 8), C2F represents the coarse-to-fine warp network (of FIG. 3), and SATT-D represents the texture translation network with the dueling triplet loss. The previous state-of-the-art system is represented by the name CP-VTON (as described by B. Wang, H. Zhang, X. Liang, Y. Chen, L. Lin, and M. Yang in Toward Characteristic-Preserving Image-based Virtual Try-on Network at CoRR, abs/1807.07688, Jul. 20, 2018. For comparing with the conventional CP-VTON system, all results of the table in FIG. 10 are obtained using 4 NVIDIA 1080Ti on a computer with 16 GB of RAM.

As shown in FIG. 10, the virtual try-on digital image generation system 102 outperforms the conventional system in each of the five tabulated metrics. For example, the SieveNet version of the virtual try-on digital image generation system 102 exhibits a structural similarity (SSIM) of 0.766, a multi-scale structural similarity (MS-SSIM) of 0.809, a Frechet Inception Distance (FID) of 14.65, a peak signal to noise ratio (PSNR) of 16.98, and an inception score (IS) of 2.82±0.09. By comparison with conventional systems, the CP-VTON exhibits a structural similarity (SSIM) of 0.698, a multi-scale structural similarity (MS-SSIM) of 0.746, a Frechet Inception Distance (FID) of 20.331, a peak signal to noise ratio (PSNR) of 14.544, and an inception score (IS) of 2.66±0.14. The PSNR metric, for instance, illustrates that the quality of the output virtual try-on digital images of the virtual try-on digital image generation system 102 is higher (16.98) than the quality of the output from the CP-VTON system (14.544).

Based on this disclosure as well as the results of the table in FIG. 10, the virtual try-on digital image generation system 102 enjoys particular advantages over the CP-VTON system. Specifically, the virtual try-on digital image generation system 102 shows improve skin texture generation, better handling of occlusion, better handling of variation in poses, better avoidance of bleeding pixels/textures, better preservation of textures and patterns upon warping, and better geometric warping. Indeed, the comparison above in FIGS. 2A-2B clearly illustrates some of these advantages that are represented numerically in the table of FIG. 10, where FIG. 2A shows results of the CP-VTON system and FIG. 2B shows results of the virtual try-on digital image generation system 102.

Figure 11:
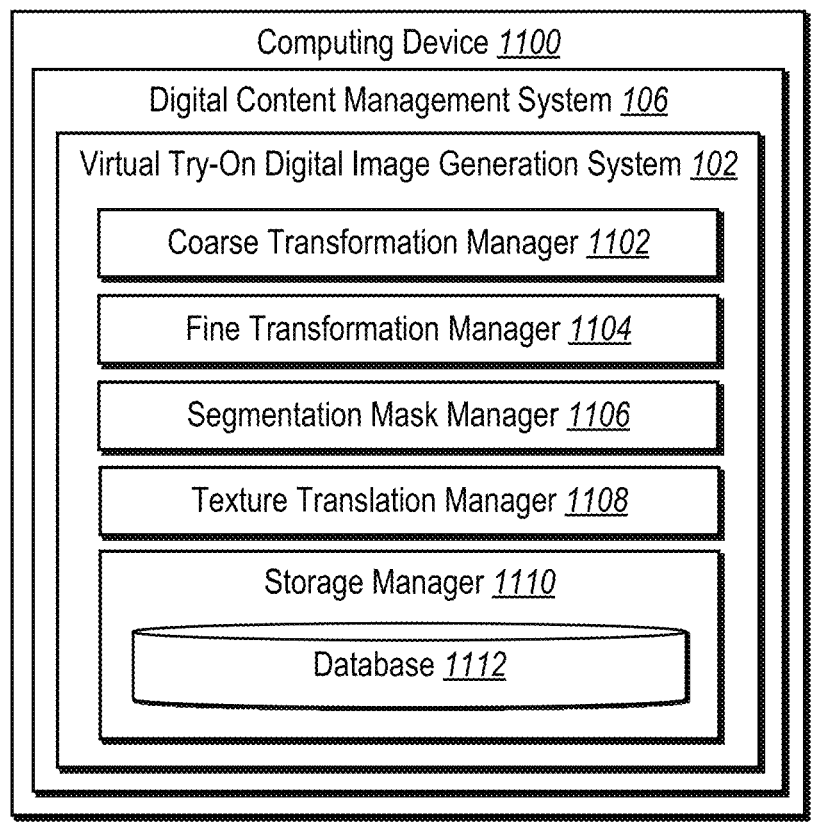
FIG. 11 illustrates a schematic diagram of a virtual try-on digital image generation system in accordance with one or more embodiments.

Looking now to FIG. 11, additional detail will be provided regarding components and capabilities of the virtual try-on digital image generation system 102. Specifically, FIG. 11 illustrates an example schematic diagram of the virtual try-on digital image generation system 102 on an example computing device 1100 (e.g., one or more of the client device 108 and/or the server(s) 104). As shown in FIG. 11, the virtual try-on digital image generation system 102 may include a coarse transformation manager 1102, a fine transformation manager 1104, a segmentation mask manager 1106, a texture translation manager 1108, and a storage manager 1110. The storage manager 1110 can include one or more memory devices that store various data such as model digital images, product digital images, warped versions of a product digital images, neural networks, and/or warping parameters.

As just mentioned, the virtual try-on digital image generation system 102 includes a coarse transformation manager 1102. In particular, the coarse transformation manager 1102 can manage, determine, generate, identify, or learn coarse transformation parameters. For example, the coarse transformation manager 1102 can utilize a coarse regression neural network to analyze a model digital image and a product digital image to determine coarse modifications to make to the product digital image to align with a pose and a shape of the model digital image. Thus, the coarse transformation manager 1102 can make coarse modifications to a product digital image to align with a model digital image. In some embodiments, the coarse transformation manager 1102 can train the coarse regression neural network to generate accurate coarse transformation parameters, as described above. The coarse transformation manager 1102 can also communicate with the storage manager 1110 to access digital images from, and to store coarse transformation parameters within, the database 1112 (e.g., the database 406).

In addition, the virtual try-on digital image generation system 102 includes a fine transformation manager 1104. In particular, the fine transformation manager 1104 can manage, determine, generate, identify, or learn fine transformation parameters. For example, the fine transformation manager 1104 can utilize a fine regression neural network to analyze a model digital image and a product digital image to determine fine modifications to make to the product digital image to align with a pose and a shape of the model digital image. Thus, the fine transformation manager 1104 can make fine modifications to a product digital image to align with a model digital image. In some embodiments, together with the fine transformation manager 1104, the fine transformation manager 1104 can train the fine regression neural network to generate accurate fine transformation parameters, as described above. The fine transformation manager 1104 can also communicate with the storage manager 1110 to access digital images from, and to store fine transformation parameters within, the database 1112.

As shown, the virtual try-on digital image generation system 102 also includes a segmentation mask manager 1106. In particular, the segmentation mask manager 1106 can manage, determine, generate, identify, or learn a corrected segmentation mask for a product digital image and a model digital image. For example, the segmentation mask manager 1106 can determine a segmentation mask associated with a model digital image and can further condition or correct the segmentation mask based on a product digital image to indicate a portion of the model digital image that is to be replaced by (warped) pixels of the product digital image. In some embodiments, the segmentation mask manager 1106 can train a neural network to generate accurate corrected segmentation masks. The segmentation mask manager 1106 can also communicate with the storage manager 1110 to store a corrected segmentation mask within the database 1112.

Further, the virtual try-on digital image generation system 102 includes a texture translation manager 1108. In particular, the texture translation manager 1108 can manage, determine, generate, implement, or learn a texture translation to translate a texture of a warped product digital image onto a model digital image. For example, the texture translation manager 1108 can replace pixels of a model digital image with pixels of a fine warped product digital image in accordance with a corrected segmentation mask (as accessed from the database 1112). Thus, the texture translation manager 1108 can generate a virtual try-on digital image based on a product digital image and a model digital image. In some embodiments, the texture translation manager 1108 can train a neural network to generate accurate virtual try-on digital images, as described above.

In one or more embodiments, each of the components of the virtual try-on digital image generation system 102 are in communication with one another using any suitable communication technologies. Additionally, the components of the virtual try-on digital image generation system 102 can be in communication with one or more other devices including one or more client devices described above. It will be recognized that although the components of the virtual try-on digital image generation system 102 are shown to be separate in FIG. 11, any of the subcomponents may be combined into fewer components, such as into a single component, or divided into more components as may serve a particular implementation. Furthermore, although the components of FIG. 11 are described in connection with the virtual try-on digital image generation system 102, at least some of the components for performing operations in conjunction with the virtual try-on digital image generation system 102 described herein may be implemented on other devices within the environment.

The components of the virtual try-on digital image generation system 102 can include software, hardware, or both. For example, the components of the virtual try-on digital image generation system 102 can include one or more instructions stored on a computer-readable storage medium and executable by processors of one or more computing devices (e.g., the computing device 1100). When executed by the one or more processors, the computer-executable instructions of the virtual try-on digital image generation system 102 can cause the computing device 1100 to perform the methods described herein. Alternatively, the components of the virtual try-on digital image generation system 102 can comprise hardware, such as a special purpose processing device to perform a certain function or group of functions. Additionally or alternatively, the components of the virtual try-on digital image generation system 102 can include a combination of computer-executable instructions and hardware.

Furthermore, the components of the virtual try-on digital image generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the virtual try-on digital image generation system 102 may be implemented as part of a stand-alone application on a personal computing device or a mobile device. Alternatively or additionally, the components of the virtual try-on digital image generation system 102 may be implemented in any application that allows creation and delivery of marketing content to users, including, but not limited to, applications in ADOBE EXPERIENCE MANAGER and ADOBE CREATIVE CLOUD, such as ADOBE PHOTO SHOP and ADOBE LIGHTROOM. "ADOBE," "ADOBE EXPERIENCE MANAGER," "ADOBE PHOTOSHOP," "ADOBE LIGHTROOM," and "ADOBE CREATIVE CLOUD" are trademarks of Adobe Inc. in the United States and/or other countries.

FIGS. 1-11, the corresponding text, and the examples provide a number of different systems, methods, and non-transitory computer readable media for training a classification neural network to classify digital images in few-shot tasks based on self-supervision and manifold mixup. In addition to the foregoing, embodiments can also be described in terms of flowcharts comprising acts for accomplishing a particular result. For example, FIGS. 12-13 illustrates flowcharts of example sequences of acts in accordance with one or more embodiments.

Figure 12:
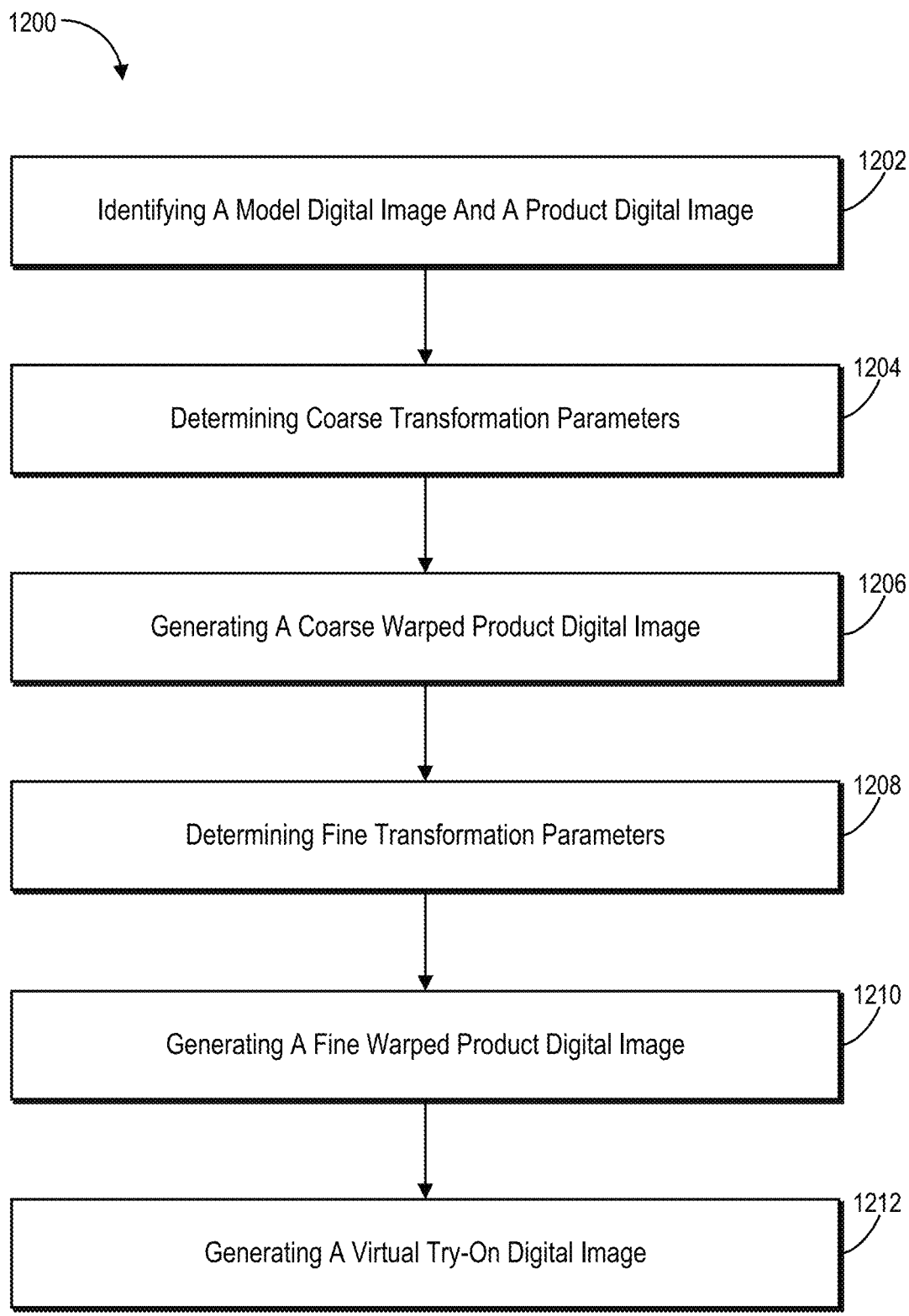
FIGS. 12-13 illustrate flowcharts of series of acts for generating a virtual try-on digital image in accordance with one or more embodiments.
Figure 13:
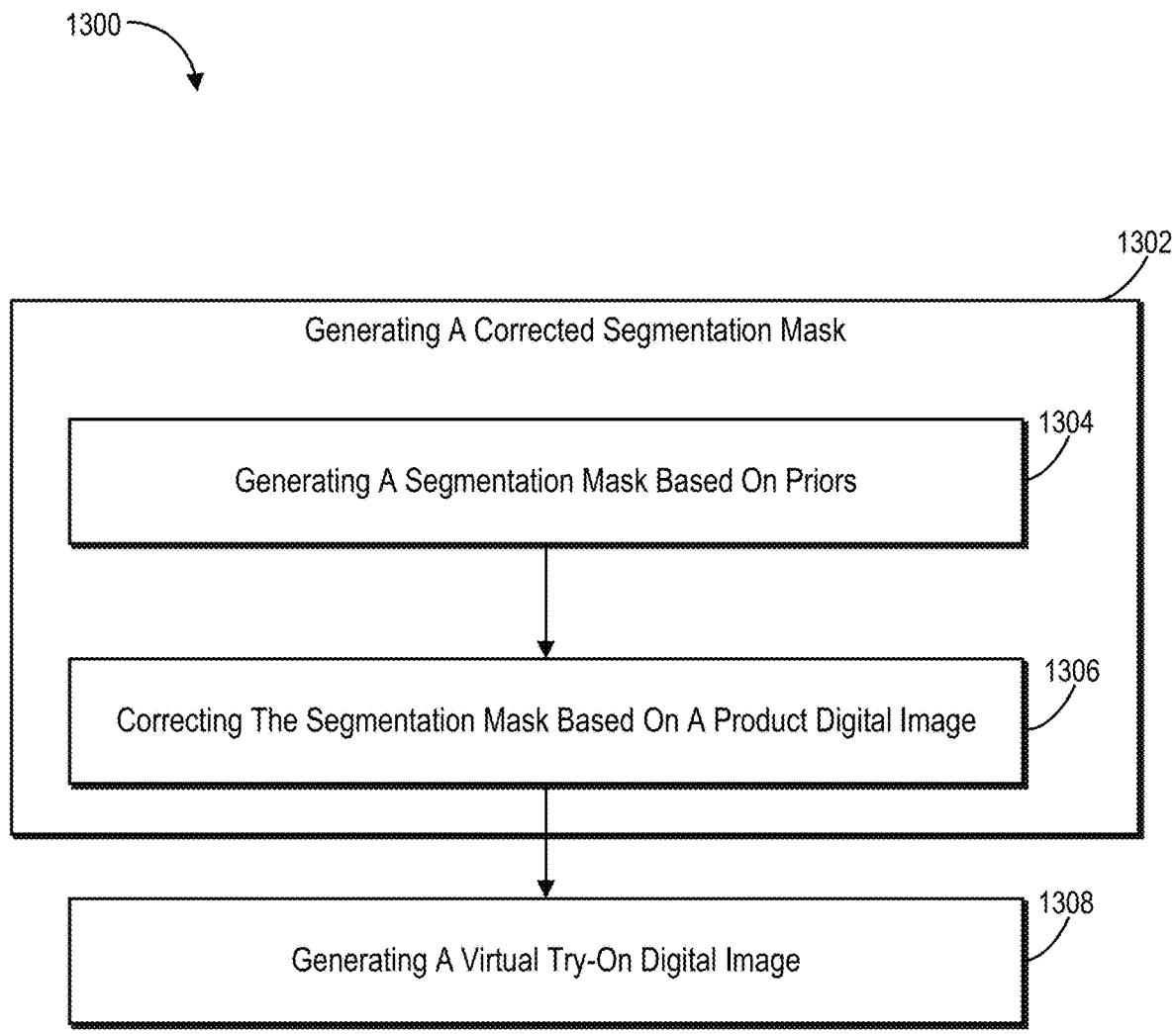

While FIGS. 12-13 illustrate acts according to one embodiment, alternative embodiments may omit, add to, reorder, and/or modify any of the acts shown in FIGS. 12-13. The acts of FIGS. 12-13 can be performed as part of a method. Alternatively, a non-transitory computer readable medium can comprise instructions, that when executed by one or more processors, cause a computing device to perform the acts of FIGS. 12-13. In still further embodiments, a system can perform the acts of FIGS. 12-13. Additionally, the acts described herein may be repeated or performed in parallel with one another or in parallel with different instances of the same or other similar acts.

FIG. 12 illustrates an example series of acts 1200 for generating a virtual try-on digital image based on transformation parameters. In particular, the series of acts 1200 includes an act 1202 of identifying a model digital image and a product digital image.

In addition, the series of acts 1200 includes an act 1204 of determining coarse transformation parameters. In particular, the act 1204 can include determining, based on the model digital image, coarse transformation parameters for transforming the product digital image to fit the model digital image. For example, the act 1204 can involve utilizing a coarse regression neural network to generate a coarse offset matrix. The coarse offset matrix can include coarse modifications for modifying portions of the product digital image to align with a pose and a shape of the model digital image As shown, the series of acts 1200 includes an act 1206 of generating a coarse warped product digital image. In particular, the act 1206 can include generating a coarse warped product digital image by modifying the product digital image in accordance with the coarse transformation parameters. For example, the act 1206 can involve generating model digital image priors based on the model digital image and aligning the coarse warped product digital image with the model digital image based on the model digital image priors. In some embodiments, the act 1206 can involve determining a shape and a pose of the model digital image and modifying the product digital image by aligning portions of the product digital image with corresponding portions of the model digital image based on the shape and the pose of the model digital image.

Further, the series of acts 1200 includes an act 1208 of determining fire transformation parameters. In particular, the act 1208 can include determining, based on the coarse warped product digital image, fine transformation parameters for transforming the coarse warped product digital image to fit the model digital image. For example, the act 1208 can involve utilizing a fine regression neural network to generate a fine offset matrix. The fine offset matrix can include fine modifications for modifying portions of the coarse warped product digital image to align with a pose and a shape of the model digital image.

The series of acts 1200 also includes an act 1210 of generating a fine warped product digital image. In particular, the act 1210 can include generating a fine warped product digital image by modifying the product digital image in accordance with the coarse transformation parameters and the fine transformation parameters.

Additionally, the series of acts 1200 includes an act 1212 of generating a virtual try-on digital image. In particular, the act 1212 can include utilizing the fine warped product digital image to generate a virtual try-on digital image comprising a depiction of a model from the model digital image with pixels replaced by the warped product digital image such that the model appears to be wearing a product from the product digital image. A virtual try-on digital image can include a depiction of a model from the model digital image with pixels replaced by the warped product digital image such that the model appears to be wearing a product from the product digital image.

FIG. 13 illustrates an example series of acts 1300 for generating a virtual try-on digital image based on a corrected segmentation mask. In particular, the series of acts 1300 can include an act 1302 of generating a corrected segmentation mask. For example, the act 1302 can involve utilizing a first convolutional neural network to generate a corrected segmentation mask based on the product digital image and the model digital image. The act 1302 can include multiple acts such as an act 1304 of generating a segmentation mask based on priors and an act 1306 of correcting the segmentation mask based on a product digital image.

For example, the act 1304 can involve generating a segmentation mask based on digital image priors of the model digital image. Indeed, the act 1304 can involve identifying a first area of the model digital image that depicts pixels to be replaced by the product digital image, identifying a second area of the model digital image that depicts other pixels not to be replaced by the product digital image, and generating the segmentation mask depicting the first area different from the second area.

In addition, the act 1306 can include correcting the segmentation mask based on the product digital image to represent a mask of the product digital image. In particular, the act 1306 can involve modifying the first area depicted within the segmentation mask to cover pixels of the model digital image corresponding to pixels covered by the product digital image.

Additionally, the series of acts 1300 includes an act 1308 of generating a virtual try-on digital image. In particular, the act 1308 can involve generating a virtual try-on digital image depicting the fine warped product digital image fit onto the model digital image by utilizing a second convolutional neural network to combine the corrected segmentation mask and the fine warped product digital image. In some embodiments, the series of acts 1300 can include (either as part of the act 1308 or as separate acts) generating texture translation priors for the model digital image and generating the virtual try-on digital image by utilizing the second convolutional neural network to analyze the corrected segmentation mask, the fine warped product digital image, and the texture translation priors. In addition, the series of acts 1300 can include (either as part of the act 1308 or as a separate act) utilizing the second convolutional neural network to generate a composition mask and a rendered person image based on the corrected segmentation mask, the fine warped product digital image, and the texture translation priors. Additionally, the act 1308 can including generating the virtual try-on digital image by combining the composition mask, the rendered person image, and the fine warped product digital image. In some embodiments, the act 1308 can involve utilizing a coarse-to-fine warping process on the product digital image in relation to the model digital image.

The series of acts 1300 can also include an act of training the first convolutional neural network to generate the corrected segmentation mask based on a cross entropy loss. Additionally, the series of acts 1300 can include an act of training the second convolutional neural network to generate the virtual try-on digital image based on a texture transfer loss. The series of acts 1300 can also include an act of training the second convolutional neural network to generate the virtual try-on digital image based further on a dueling triplet loss.

In some embodiments, the series of acts 1200 and/or the series of acts 1300 can include an act of training one or more regression neural networks for use in performing the step for coarse-to-fine warping of the product digital image to align with the model digital image based on a perceptual geometric loss. Additionally, the series of acts 1200 and/or the series of acts 1300 can include an act of training one or more convolutional neural networks for use in performing the step for applying the texture transfer process to generate the virtual try-on digital image based on a texture transfer loss. Training the one or more convolutional neural networks can include determining a dueling triplet loss associated with the one or more convolutional neural networks. For example, the series of acts 1200 and/or the series of acts 1300 can include jointly training a coarse regression neural network for generating the coarse warped product digital image and a fine regression neural network for generating the fine warped product digital image based on a perceptual geometric loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
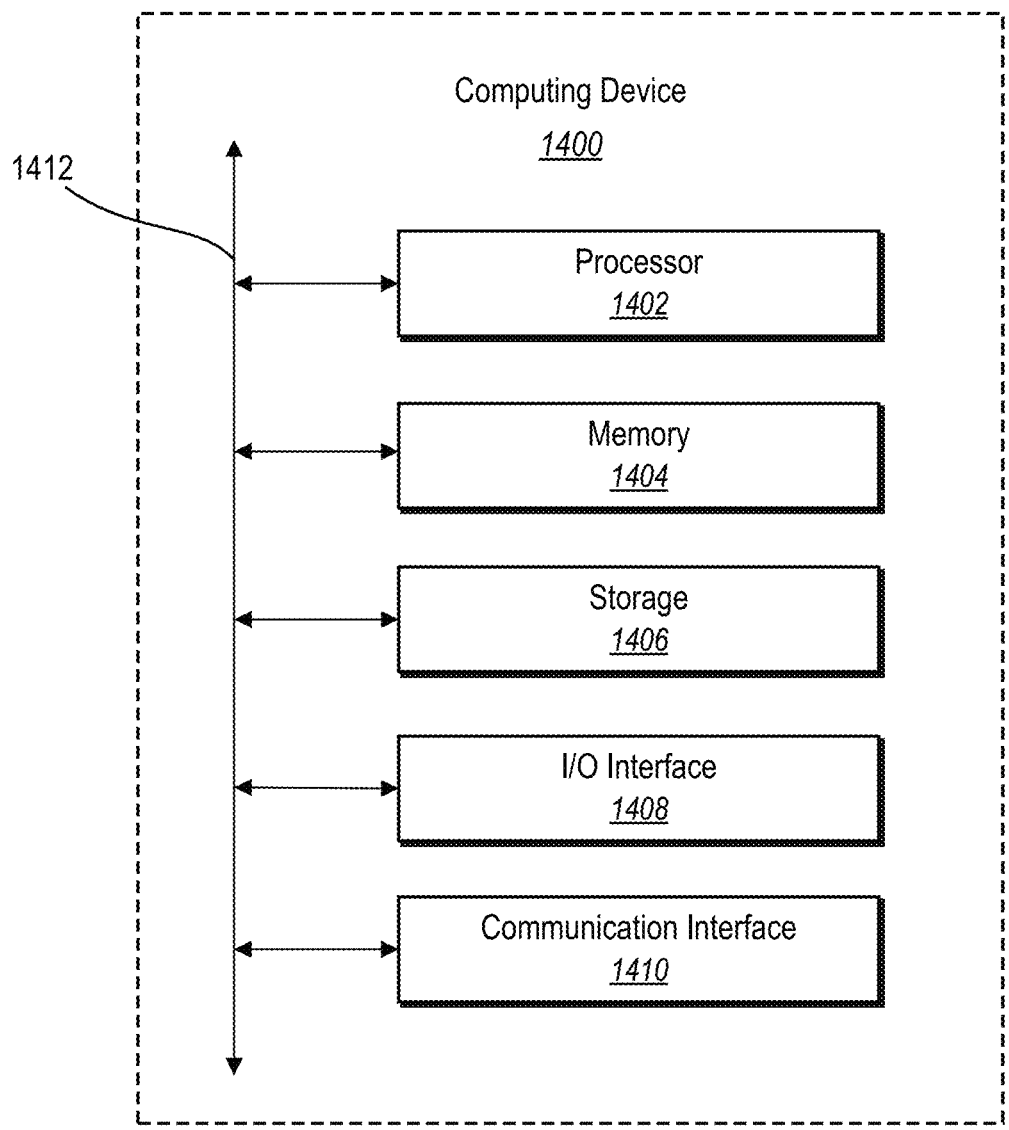
FIG. 14 illustrates a block diagram of an example computing device in accordance with one or more embodiments.

FIG. 14 illustrates, in block diagram form, an example computing device 1400 (e.g., the computing device 1100, the client device 108, and/or the server(s) 104) that may be configured to perform one or more of the processes described above. One will appreciate that the virtual try-on digital image generation system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memory devices, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for generating customized try-on digital images, the computer-implemented method comprising:
   identifying a model digital image and a product digital image;
   performing a step for coarse-to-fine warping of the product digital image to align with the model digital image; and
   performing a step for applying a texture transfer process to the warped product digital image and the model digital image to generate a virtual try-on digital image.

2. The computer-implement method of claim 1, wherein the virtual try-on digital image comprises a depiction of a model from the model digital image with pixels replaced by the warped product digital image such that the model appears to be wearing a product from the product digital image.

3. The computer-implemented method of claim 1, further comprising training one or more regression neural networks for use in performing the step for coarse-to-fine warping of the product digital image to align with the model digital image based on a perceptual geometric loss.

4. The computer-implemented method of claim 1, further comprising training one or more convolutional neural networks for use in performing the step for applying the texture transfer process to generate the virtual try-on digital image based on a texture transfer loss.

5. The computer-implemented method of claim 4, wherein training the one or more convolutional neural networks comprises determining a dueling triplet loss associated with the one or more convolutional neural networks.

6. A non-transitory computer readable medium comprising instructions that, when executed by at least one processor, cause a computing device to:
   determine, for a model digital image, coarse transformation parameters and fine transformation parameters for transforming a product digital image to fit the model digital image utilizing a coarse-to-fine warp neural network;
   generate a fine warped product digital image by modifying the product digital image in accordance with the coarse transformation parameters and the fine transformation parameters;
   generate a conditional segmentation mask indicating pixels of the model digital image to replace with the fine warped product digital image utilizing a conditional segmentation mask prediction neural network to process the product digital image and a set of digital image priors corresponding to a segmentation mask of the model digital image; and
   utilize the fine warped product digital image to generate, in accordance with the conditional segmentation mask, a virtual try-on digital image comprising a depiction of a model from the model digital image by replacing pixels of the product digital image with the fine warped product digital image such that the model appears to be wearing a product from the product digital image.

7. The non-transitory computer readable medium of claim 6, further comprising instructions that, when executed by the at least one processor, cause the computing device to determine the coarse transformation parameters by utilizing a coarse regression neural network to generate a coarse offset matrix.

8. The non-transitory computer readable medium of claim 7, wherein the coarse offset matrix comprises coarse modifications for modifying portions of the product digital image to align with a pose and a shape of the model digital image.

9. The non-transitory computer readable medium of claim 6, further comprising instructions that, when executed by the at least one processor, cause the computing device to determine the fine transformation parameters by utilizing a fine regression neural network to generate a fine offset matrix.

10. The non-transitory computer readable medium of claim 9, wherein the fine offset matrix comprises fine modifications for modifying portions of the product digital image to align with a pose and a shape of the model digital image.

11. The non-transitory computer readable medium of claim 6, further comprising instructions that, when executed by the at least one processor, cause the computing device to generate the fine warped product digital image by aligning the product digital image with the model digital image utilizing the conditional segmentation mask.

12. The non-transitory computer readable medium of claim 6, further comprising instructions that, when executed by the at least one processor, cause the computing device to generate the fine warped product digital image by:
   determining a shape and a pose of the model digital image; and
   modifying the product digital image by aligning portions of the product digital image with corresponding portions of the model digital image based on the shape and the pose of the model digital image.

13. The non-transitory computer readable medium of claim 6, further comprising instructions that, when executed by the at least one processor, cause the computing device to jointly train a coarse regression neural network and a fine regression neural network for generating the fine warped product digital image based on a perceptual geometric loss.

14. A system comprising:
   one or more memory devices comprising a model digital image, a product digital image, and a fine warped product digital image comprising a warped version of the product digital image fit to the model digital image; and
   one or more server devices configured to cause the system to:
   utilize a conditional segmentation mask prediction neural network to generate a conditional segmentation mask based on the product digital image and the model digital image by:

generating an initial segmentation mask from digital image priors and indicating bounds between portions of the model digital image corresponding to different classifications; and modifying the initial segmentation mask to adjust the bounds between the portions of the model digital image to reflect the product digital image; and generate a virtual try-on digital image depicting the fine warped product digital image fit onto the model digital image by utilizing a convolutional neural network to combine the conditional segmentation mask and the fine warped product digital image.

15. The system of claim 14, wherein the one or more server devices are further configured to cause the system to generate the initial segmentation mask by:

identifying a first area of the model digital image that depicts pixels to be replaced by the product digital image;

identifying a second area of the model digital image that depicts other pixels not to be replaced by the product digital image; and generating the initial segmentation mask depicting the first area different from the second area.

16. The system of claim 15, wherein modifying the initial segmentation mask comprises modifying the first area depicted within the initial segmentation mask to cover pixels of the model digital image corresponding to pixels covered by the product digital image.

17. The system of claim 14, wherein the one or more server devices are further configured to cause the system to generate the fine warped product digital image by utilizing a coarse-to-fine warping process on the product digital image in relation to the model digital image.

18. The system of claim 14, wherein the one or more server devices are further configured to cause the system to:

generate texture translation priors for the model digital image that capture pixels of the model digital image not to be replaced; and generate the virtual try-on digital image by utilizing the convolutional neural network to combine the conditional segmentation mask, the fine warped product digital image, and the texture translation priors.

19. The system of claim 18, wherein the one or more server devices are further configured to cause the system to utilize the convolutional neural network to generate a composition mask and a rendered person image based on the conditional segmentation mask, the fine warped product digital image, and the texture translation priors.

20. The system of claim 19, wherein the one or more server devices are further configured to cause the system to generate the virtual try-on digital image by combining the composition mask, the rendered person image, and the fine warped product digital image.

* * * * *